(12) United States Patent
Moon et al.

(10) Patent No.: US 7,676,732 B2
(45) Date of Patent: Mar. 9, 2010

(54) TRANSCEIVER APPARATUS AND METHOD FOR EFFICIENT RETRANSMISSION OF HIGH-SPEED PACKET DATA

(75) Inventors: Yong-Suk Moon, Songnam-shi (KR); Hun-Kee Kim, Seoul (KR); Jae-Seung Yoon, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 155 days.

(21) Appl. No.: 11/093,910

(22) Filed: Mar. 31, 2005

(65) Prior Publication Data
US 2005/0204251 A1 Sep. 15, 2005

Related U.S. Application Data

(62) Division of application No. 10/287,157, filed on Nov. 4, 2002.

(30) Foreign Application Priority Data
Nov. 2, 2001 (KR) .................. 2001-68316

(51) Int. Cl.
*H03M 13/00* (2006.01)
*H03M 13/03* (2006.01)
(52) U.S. Cl. .................. 714/774; 714/791; 714/751
(58) Field of Classification Search .................. 714/774, 714/791, 751
See application file for complete search history.

(56) References Cited

U.S. PATENT DOCUMENTS 4,675,864 A * 6/1987 Bliek et al. .................. 370/449

(Continued)

FOREIGN PATENT DOCUMENTS

DE 197 31 261 7/1997

(Continued)

OTHER PUBLICATIONS

British Search Report dated Mar. 13, 2003, issued in a counterpart application, namely Appln No. GB 0225605.5.

(Continued)

*Primary Examiner*—Joseph D Torres
(74) *Attorney, Agent, or Firm*—The Farrell Law Firm, LLP

(57) ABSTRACT

A method for retransmitting coded bits by a transmitter in response to a retransmission request from a receiver in a mobile communication system. The method comprises determining a modulation technique to be used at retransmission as a modulation technique having a lower modulation order than a modulation technique used at initial transmission; determining a puncturing pattern according to an HARQ (Hybrid Automatic Repeat Request) type, and selecting as many coded bits as the number of coded bits that can be symbol-mapped by the determined modulation technique, among the coded bits punctured by the determined puncturing pattern; and symbol-mapping the selected coded bits by the determined modulation technique, and transmitting the symbol-mapped coded bits to the receiver.

12 Claims, 18 Drawing Sheets

U.S. PATENT DOCUMENTS

| | | | |
|---|---|---|---|
| 5,432,787 A * | 7/1995 | Chethik | 370/473 |
| 5,946,320 A * | 8/1999 | Decker | 370/428 |
| 6,208,663 B1 * | 3/2001 | Schramm et al. | 370/465 |
| 6,308,294 B1 * | 10/2001 | Ghosh et al. | 714/751 |
| 6,438,723 B1 * | 8/2002 | Kalliojarvi | 714/751 |
| 6,704,898 B1 * | 3/2004 | Furuskar et al. | 714/751 |
| 6,721,834 B2 * | 4/2004 | Das et al. | 710/117 |
| 6,799,026 B1 * | 9/2004 | Scherzer et al. | 455/279.1 |

FOREIGN PATENT DOCUMENTS

GB  2 378 870  2/2003
WO  WO 02/089389  11/2002

OTHER PUBLICATIONS

German Office Action dated Oct. 20, 2003 issued in a counterpart application, namely Appln. No. 10251289.2-31.

Bossert et al., "Digitale Netze", 1999, pp. 158-159.

Matsuoka et al., "Adaptive Modulation System with Variable Coding Rate Concatenated Code for High Quality Multi-Media Communication Systems", 1996 IEEE, pp. 487-491.

Bolinth et al., Brain Enhancements for the HIPERLAN/2 Air Interface to Support QoS in Wirelwss Communications, pp. 5-10.

* cited by examiner

CASE 1) ONLY SYSTEMATIC (RE-TX SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X | O X | O X | O X | O X | O X |
| P1 | O X |     |     | O   |     |     |
| P2 |     | O   |     |     | O   |     |
| P3 |     |     | O   |     |     | O   |

CASE 2) ALL REDUNDANCY VERSIONS (RE-TX MASK SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X | O X | O   | O   | O   | O X |
| P1 | O X |     |     | O X |     |     |
| P2 |     | O   |     |     | O X |     |
| P3 |     |     | O X |     |     | O   |

CASE 3) PARTIAL REDUNDANCY VERSIONS WITH S PRIORITY (RE-TX MASK SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X | O X | O   | O X | O   | O X |
| P1 | O X |     |     | O   |     |     |
| P2 |     | O   |     |     | O X |     |
| P3 |     |     | O X |     |     | O   |

CASE 4) SEQUENTIAL REDUNDANCY VERSION TYPE I (RE-TX MASK MERGE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X | O X | O   | O   | O   | O X |
| P1 | O X |     |     | X   | O   |     |
| P2 |     | O   |     |     | X   | O   |
| P3 |     |     | O   |     | X   | O   |

CASE 5) SEQUENTIAL REDUNDANCY VERSION TYPE II (RE-TX MASK MERGE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X | O   | O   | O X | O   | O   |
| P1 | O X |     |     | O   | X   |     |
| P2 |     | O X |     |     | O   | X   |
| P3 |     |     | O X |     |     | O   |

FIG.7

CASE 1) ONLY SYSTEMATIC (RE-TX SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X | O X | O | O X | O X | O |
| S(2) | O X | O X | O | O | O X | O X |
| S(3) | O X | O | O X | O X | O | O X |
| P1 | O X | | | O | | |
| P2 | | O | | | O | |
| P3 | | | O | | | O |

CASE 2) ALL REDUNDANCY VERSION (RE-TX MASK SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X | O X | O | O X | O | O X |
| S(2) | O X | O X | O | O | O X | O |
| S(3) | O X | O | O X | O | O | O X |
| P1 | O X | | | O X | | |
| P2 | | O | | | O X | |
| P3 | | | O X | | | O |

CASE 3) ALL REDUNDANCY VERSION WITH S PRIORITY (RE-TX MASK SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X | O X | O | O X | O | O X |
| S(2) | O X | O X | O | O X | O | O X |
| S(3) | O X | O | O X | O | O X | O |
| P1 | O X | | | O | | |
| P2 | | O | | | O X | |
| P3 | | | O X | | | O |

CASE 4) SEQUENTIAL REDUNDANCY VERSION TYPE (RE-TX MASK MERGE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X | O X | O | O X | O | |
| S(2) | O X | O X | O | O | O X | O |
| S(3) | O X | O | O X | O | O | O X |
| P1 | O X | | | X O | | X |
| P2 | | O | | | X O | |
| P3 | | | O | | | X O |

FIG. 8

CASE 1) ALL REDUNDANCY VERSIONS WITH SWITCHING TYPE I (RE-TX MASK SEPARATE)

| # of TX / Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X |     |     | O X |     |     |
| P1 | O X |     |     | O   |     |     |
| P2 |     | O X |     |     | O   |     |
| P3 |     | O   |     |     | O X |     |
| P4 |     |     | O X |     |     | O   |
| P5 |     |     | O   |     |     | O X |

CASE 2) ALL REDUNDANCY VERSIONS WITH SWITCHING TYPE II (RE-TX MASK SEPARATE)

| # of TX / Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X |     |     | O X |     |     |
| P1 | O X |     |     | O   |     |     |
| P2 |     | O X |     |     | O   |     |
| P3 |     | O   |     |     | O X |     |
| P4 |     |     | O   |     |     | O X |
| P5 |     |     | O X |     |     | O   |

CASE 3) PARTIAL REDUNDANCY W/O SWITCHING TYPE I (RE-TX MASK SEPARATE)

| # of TX / Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X |     |     | O X |     |     |
| P1 | O X |     |     | O   |     |     |
| P2 |     | O X |     |     | O X |     |
| P3 |     | O   |     |     | O   |     |
| P4 |     |     | O X |     |     | O X |
| P5 |     |     | O   |     |     | O   |

CASE 4) PARTIAL REDUNDANCY W/O SWITCHING TYPE II (RE-TX MASK SEPARATE)

| # of TX / Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X |     |     | O X |     |     |
| P1 | O X |     |     | O   |     |     |
| P2 |     | O X |     |     | O X |     |
| P3 |     | O   |     |     | O   |     |
| P4 |     |     | O   |     |     | O   |
| P5 |     |     | O X |     |     | O X |

CASE 5) SEQUENTIAL REDUNDANCY VERSION TYPE I (RE-TX MASK MERGE)

| # of TX / Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X | X   |     | O   |     |     |
| P1 | O X |     | X   | O   |     |     |
| P2 |     | O   |     |     | X O |     |
| P3 |     | O   |     |     | O X |     |
| P4 |     |     | O   |     |     | O X |
| P5 |     |     | O   |     |     | O   |

CASE 6) SEQUENTIAL REDUNDANCY VERSION TYPE II (RE-TX MASK MERGE)

| # of TX / Subpacket | INIT-TX (16 QAM) | R1 (QPSK) | R2 (QPSK) | R3 (QPSK) | R4 (QPSK) | R5 (QPSK) |
|---|---|---|---|---|---|---|
| S  | O X |     |     | O   |     | X   |
| P1 | O X |     |     | O   |     |     |
| P2 |     | O X |     |     | O   |     |
| P3 |     | O   | X   |     | O   |     |
| P4 |     |     | O   | X   |     | O   |
| P5 |     |     | O   |     | X   | O   |

FIG. 9

CASE 1) ALL REDUNDANCY VERSIONS WITH SWITCHING TYPE I(RE-TX MASK SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X |  |  | O X |  |  |
| S(2) | O X |  |  | O X |  |  |
| S(3) | O X |  |  | O |  |  |
| P1 | O X |  |  | O |  |  |
| P2 |  | O X |  |  | O |  |
| P3 |  | O |  |  | O X |  |
| P4 |  |  | O X |  |  | O |
| P5 |  |  | O |  |  | O X |

CASE 2) ALL REDUNDANCY VERSIONS WITH SWITCHING TYPE II(RE-TX MASK SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X |  |  | O X |  |  |
| S(2) | O X |  |  | O X |  |  |
| S(3) | O X |  |  | O |  |  |
| P1 | O X |  |  | O |  |  |
| P2 |  | O X |  |  | O |  |
| P3 |  | O |  |  | O X |  |
| P4 |  |  | O |  |  | O X |
| P5 |  |  | O X |  |  | O |

CASE 3) PARTIAL REDUNDANCY W/O SWITCHING TYPE I (RE-TX MASK SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X |  |  | O X |  |  |
| S(2) | O X |  |  | O X |  |  |
| S(3) | O X |  |  | O |  |  |
| P1 | O X |  |  | O |  |  |
| P2 |  | O X |  |  | O X |  |
| P3 |  | O |  |  | O |  |
| P4 |  |  | O X |  |  | O X |
| P5 |  |  | O |  |  | O |

CASE 4) PARTIAL REDUNDANCY W/O SWITCHING TYPE II (RE-TX MASK SEPARATE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X |  |  | O X |  |  |
| S(2) | O X |  |  | O X |  |  |
| S(3) | O X |  |  | O |  |  |
| P1 | O X |  |  | O |  |  |
| P2 |  | O X |  |  | O X |  |
| P3 |  | O |  |  | O |  |
| P4 |  |  | O |  |  | O |
| P5 |  |  | O X |  |  | O X |

CASE 5) SEQUENTIAL REDUNDANCY VERSION TYPE I (RE-TX MASK MERGE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X | X |  | O |  |  |
| S(2) | O X | X |  | O |  |  |
| S(3) | O X |  | X | O |  |  |
| P1 | O X |  | X | O |  |  |
| P2 |  | O |  | X | O |  |
| P3 |  | O |  |  | O X |  |
| P4 |  |  | O |  |  | O X |
| P5 |  |  | O |  |  | O |

CASE 6) SEQUENTIAL REDUNDANCY VERSION TYPE II (RE-TX MASK MERGE)

| # of TX Subpacket | INIT-TX (16 QAM) | R1 (QPSK) | R2 (QPSK) | R3 (QPSK) | R4 (QPSK) | R5 (QPSK) |
|---|---|---|---|---|---|---|
| S(1) | O X |  |  | O |  | X |
| S(2) | O X |  |  | O |  | X |
| S(3) | O X |  |  | O |  |  |
| P1 | O X |  |  | O |  |  |
| P2 |  | O X |  |  | O |  |
| P3 |  | O |  | X | O |  |
| P4 |  |  | O | X |  | O |
| P5 |  |  | O |  | X | O |

FIG. 10

CASE 1) SWITCHING (RE-TX MASK SEPARATE)

| # of TX Subpacket | INIT-TX (16 QAM) | R1 (QPSK) | | R2 (QPSK) | | R3 (QPSK) | | R4 (QPSK) | | R5 (QPSK) | |
|---|---|---|---|---|---|---|---|---|---|---|---|
| S | O | X | O | X | O | | O | X | O | | O | X |
| P | O | X | O | | O | X | O | | O | X | O | |

CASE 2) SYSTEMATIC ONLY (RE-TX SEPARATE)

| # of TX Subpacket | INIT-TX (16 QAM) | R1 (QPSK) | | R2 (QPSK) | | R3 (QPSK) | | R4 (QPSK) | | R5 (QPSK) | |
|---|---|---|---|---|---|---|---|---|---|---|---|
| S | O | X | O | X | O | X | O | X | O | X | O | X |
| P | O | X | O | | O | | O | | O | | O | |

FIG. 11a

CASE 1) SWITCHING (RE-TX MASK SEPARATE)

| # of TX Subpacket | INIT-TX (16 QAM) | R1 (QPSK) | | R2 (QPSK) | | R3 (QPSK) | | R4 (QPSK) | | R5 (QPSK) | |
|---|---|---|---|---|---|---|---|---|---|---|---|
| S1 | O | X | O | X | O | | O | X | O | | O | X |
| S2 | O | X | O | X | O | | O | X | O | | O | X |
| S3 | O | X | O | | O | X | O | | O | X | O | |
| P | O | X | O | | O | X | O | | O | X | O | |

CASE 2) SYSTEMATIC ONLY (RE-TX SEPARATE)

| # of TX Subpacket | INIT-TX (16 QAM) | R1 (QPSK) | | R2 (QPSK) | | R3 (QPSK) | | R4 (QPSK) | | R5 (QPSK) | |
|---|---|---|---|---|---|---|---|---|---|---|---|
| S1 | O | X | O | X | O | X | O | | O | X | O | X |
| S2 | O | X | O | X | O | | O | X | O | X | O | |
| S3 | O | X | O | | O | X | O | X | O | | O | X |
| P | O | X | O | | O | | O | | O | | O | |

FIG. 11b

TRANSCEIVER APPARATUS AND METHOD FOR EFFICIENT RETRANSMISSION OF HIGH-SPEED PACKET DATA

PRIORITY

This application is a Divisional of U.S. application Ser. No. 10/287,157, filed on Nov. 4, 2002, which claims priority to an application entitled "Transceiver Apparatus and Method for Efficient Retransmission of High-Speed Packet Data" filed in the Korean Industrial Property Office on Nov. 2, 2001 and assigned Serial No. 2001-68316, the contents of which are hereby incorporated by reference.

BACKGROUND OF THE INVENTION

1. Field of the Invention

The present invention relates generally to a data transceiver apparatus and method in a CDMA (Code Division Multiple Access) mobile communication system, and in particular, to an apparatus and method for transmitting and receiving data using a variable modulation technique during retransmission.

2. Description of the Related Art

Presently, the mobile communication system has evolved from an early voice-based communication system to a high-speed, high-quality radio data packet communication system for providing a data service and a multimedia service. In addition, a $3^{rd}$ generation mobile communication system, divided into an asynchronous 3GPP ($3^{rd}$ Generation Partnership Project) system and a synchronous 3GPP2 ($3^{rd}$ Generation Partnership Project 2) system, is being standardized for a high-speed, high-quality radio data packet service. For example, standardization on HSDPA (High Speed Downlink Packet Access) is performed by the 3GPP, while standardization on 1xEV-DV (1xEvolution-Data and Voice) is performed by the 3GPP2. Such standardizations are implemented to determine solutions for high-speed, high-quality radio data packet transmission services of 2 Mbps or more in the $3^{rd}$ generation mobile communication system. Further, a $4^{th}$ generation mobile communication system has been proposed, which will provide a high-speed, high-quality multimedia service superior to that of the $3^{rd}$ generation mobile communication system.

A principal factor that impedes a high-speed, high-quality radio data service lies in the radio channel environment. The radio channel environment frequently changes due to a variation in signal power caused by white noise and fading, shadowing, Doppler effect caused by the movement of and the frequent change in speed of a UE (User Equipment), and interference caused by other users and multipath signals. Therefore, in order to provide a high-speed radio data packet service, there is a need for an improved technology capable of increasing adaptability to variations in the channel environment in addition to the general technology provided for the existing $2^{nd}$ or $3^{rd}$ generation mobile communication system. A high-speed power control method used in the existing system also increases adaptability to variations in the channel environment. However, both the 3GPP and the 3GPP2, implementing standardization on the high-speed data packet transmission, reference the AMCS (Adaptive Modulation/Coding Scheme) and HARQ (Hybrid Automatic Repeat Request) techniques.

The AMCS is a technique for adaptively changing a modulation technique and a coding rate of a channel encoder according to a variation in the downlink channel environment. Commonly, to detect the downlink channel environment, a UE measures a signal-to-noise ratio (SNR) and transmits the SNR information to a Node B over an uplink. The Node B predicts the downlink channel environment based on the received SNR information, and designates a proper modulation technique and coding rate according to the predicted value. The modulation techniques available for the AMCS include QPSK (Quadrature Phase Shift Keying), 8PSK (8-ary Phase Shift Keying), 16QAM (16-ary Quadrature Amplitude Modulation), and 64QAM (64-ary Quadrature Amplitude Modulation), and the coding rates available for the AMCS include ½ and ¾. An AMCS system applies the high-order modulations (16QAM and 64QAM) and the high coding rate ¾ to the UE located in the vicinity of the Node B, having a good channel environment, and applies the low-order modulations (QPSK and 8PSK) and the low coding rate ½ to the UE located in a cell boundary. In addition, compared to the existing high-speed power control method, the AMCS decreases an interference signal, thereby improving the average system performance.

The HARQ is a link control technique for correcting an error by retransmitting the errored data upon an occurrence of a packet error at an initial transmission. Generally, the HARQ is classified into Chase Combining (CC), Full Incremental Redundancy (FIR), and Partial Incremental Redundancy (PIR).

CC is a technique for transmitting a packet such that the whole packet transmitted at a retransmission is equal to the packet transmitted at the initial transmission. In this technique, a receiver combines the retransmitted packet with the initially transmitted packet that is previously stored in a buffer. By doing so, it is possible to increase reliability of coded bits input to a decoder, thus resulting in an increase in the overall system performance. Combining the two same packets is similar to repeated coding in terms of the effects, so it is possible to increase a performance gain by about 3 dB on average.

FIR is a technique for transmitting a packet comprised of only redundant bits generated from the channel encoder instead of the same packet, thus improving performance of a decoder in the receiver. That is, the FIR uses the new redundant bits as well as the initially transmitted information during decoding, resulting in a decrease in the coding rate, which in turn thereby improves performance of the decoder. It is well known in coding theory that a performance gain by a low coding rate is higher than a performance gain by repeated coding. Therefore, the FIR is superior to the CC in terms of only the performance gain.

Unlike the FIR, the PIR is a technique for transmitting a combined data packet of the information bits and the new redundant bits at retransmission. Therefore, the PIR can obtain the similar effect as the CC by combining the retransmitted information bits with the initially transmitted information bits during decoding, and also obtain the similar effect as the FIR by performing the decoding using the redundant bits. The PIR has a coding rate slightly higher than that of the FIR, showing intermediate performance between the FIR and the CC. However, the HARQ should be considered in the light of not only the performance but also the system complexity, such as a buffer size and signaling of the receiver. As a result, it is difficult to determine which technique is optimal for a given system.

The AMCS and the HARQ are separate techniques for increasing adaptability to the variations in the link environment. It is possible to remarkably improve the system performance by combining the two techniques. That is, the transmitter determines by the AMCS, a modulation technique and a coding rate proper for a downlink channel condition and then transmits packet data according to the determined modulation technique and coding rate. Then, upon failure to decode the data packet transmitted by the transmitter, the receiver sends a retransmission request. Upon receipt of the retransmission request from the receiver, the Node B retransmits the data packet by the HARQ.

FIG. 1 illustrates an existing transmitter for high-speed packet data transmission, wherein it is possible to realize various AMCS techniques and HARQ techniques by controlling a channel encoder 112.

Referring to FIG. 1, the channel encoder 112 is comprised of an encoder (not shown) and a puncturer (not shown). When input data at a determined data rate is applied to an input terminal of the channel encoder 112, the encoder performs encoding in order to decrease a transmission error rate. Further, the puncturer punctures an output of the encoder according to a coding rate and an HARQ type previously determined by a controller 122, and provides its output to a channel interleaver 114. The future mobile communication system needs a powerful channel coding technique in order to reliably transmit high-speed multimedia data. The channel encoder 112, as illustrated in FIG. 2, is comprised of a turbo encoder 200 with a mother coding rate of R=⅕, a puncturer 216 and a buffer 202. It is known in the art that channel coding by a turbo encoder performs closest to the Shannon limit in terms of a bit error rate (BER) even at a low SNR. Channel coding by a turbo encoder has also been adopted for the HSDPA and 1xEV-DV standardization by the 3GPP and the 3GPP2. The output of the turbo encoder 200 can be divided into systematic bits and parity bits. The "systematic bits" refer to actual information bits to be transmitted, while the "parity bits" refer to a signal used to help a receiver correct a possible transmission error. The puncturer 216 selectively punctures the systematic bits or the parity bits output from the encoder 200, satisfying a determined coding rate. The systematic bits and the parity bits from the turbo encoder 200 are temporarily stored in the buffer 202, to be used during retransmission at a retransmission request of the receiver.

Referring to FIG. 2, upon receiving one input data frame, the turbo encoder 200 outputs the intact input data frame as a systematic bit frame X, and further outputs two different parity bit frames $Y_1$ and $Y_2$. In addition, the turbo encoder 200 outputs two different parity bit frames $Z_1$ and $Z_2$ by performing interleaving and encoding on the input data frame. The systematic bit frame X and the parity bit frames $Y_1, Y_2, Z_1$ and $Z_2$ are provided to the puncturer 216 in a transmission unit of 1, 2, . . . , N. The puncturer 216 determines a puncturing pattern according to a control signal provided from the controller 122 of FIG. 1, and performs puncturing on the systematic bit frame X, and the four different parity bit frames $Y_1$, $Y_2$, $Z_1$ and $Z_2$ using the determined puncturing pattern, thus outputting desired systematic bits S and parity bits P. Here, the buffer 202 is provided between the turbo encoder 200 and the puncturer 216 in order to facilitate realization of the HARQ. That is, when IR (Incremental Redundancy) is used as the HARQ, different coded bits must be transmitted at each retransmission. Therefore, all coded bits generated by the turbo encoder 200 at a mother code rate are stored in the buffer 202, and the stored coded bits are output according to a corresponding puncturing pattern at each retransmission. If the buffer 202 is not provided, the same coding process must be repeated by the turbo encoder 200 at each retransmission, affecting the processing time and power efficiency. However, when CC is used as the HARQ, the same data is transmitted at each retransmission. In this case, the use of the buffer 202 causes a decrease in the efficiency, so it would be more efficient to perform a retransmission process after the channel interleaver 114 of FIG. 1.

As described above, the puncturing pattern used to puncture the coded bits by the puncturer 216 depends upon the coding rate and the HARQ type. That is, using the CC, it is possible to transmit the same packet at each transmission by puncturing the coded bits such that the puncturer 216 has a fixed combination of the systematic bits and the parity bits according to a given coding rate. Using PIR, the puncturer 216 punctures the coded bits in a combination of the systematic bits and the parity bits according to the given coding rate at initial transmission, and punctures the coded symbols in a combination of various parity bits at each retransmission, thus decreasing in the overall coding rate. For example, using the CC with the coding rate of ½, the puncturer 216 can continuously output the same bits X and $Y_1$ for one input bit at initial transmission and retransmission, by fixedly using [1 1 0 0 0 0] in the order of the coded bits [X $Y_1$ $Y_2$ X' $Z_1$ $Z_2$] as the puncturing pattern. Using the FIR, the puncturer 216 outputs the coded bits in the order of [$X_1$ $Y_{11}$ $X_2$ $Z_{21}$] at initial transmission and in the order of [$Y_{21}$ $Z_{21}$ $Y_{12}$ $Z_{12}$] at retransmission for two input bits, by using [1 1 0 0 0 0; 1 0 0 0 0 1] and [0 0 1 0 0 1; 0 1 0 0 1 0] as the puncturing patterns at initial transmission and retransmission, respectively. Meanwhile, though not separately illustrated, the channel encoder using R=⅓ codes adopted by the 3GPP2 can be realized by the turbo encoder 200 and the puncturer 216 of FIG. 2.

A packet data transmission operation by the AMCS system and the HARQ system realized by FIG. 1 will be described herein below. Before transmission of a new packet, the controller 122 of the transmitter determines a proper modulation technique and a coding rate based on the downlink channel condition information provided from the receiver. Thereafter, the controller 122 controls the channel encoder 112, a modulator 116 and a channel demultiplexer 118 in a physical layer based on the determined modulation technique and coding rate and a predefined HARQ type. A data rate in the physical layer is determined according to the determined modulation technique and coding rate and the number of multiple codes in use. The channel encoder 112, under the control of the controller 122, performs coding by the turbo encoder 200 and performs bit puncturing by the puncturer 216 according to a given puncturing patter, thereby outputting coded bits. The coded bits output from the channel encoder 112 are provided to the channel interleaver 114, where they are subject to interleaving. Interleaving is a technique for preventing a burst error by randomizing the input bits to disperse data symbols into several places instead of concentrating the data symbols in the same place in a fading environment. For ease of explanation, the size of the channel interleaver 114 is assumed to be greater than or equal to the total number of the coded bits. The modulator 116 symbol-maps the interleaved coded bits according to the modulation technique previously determined by the controller 122 and a given symbol mapping technique. If the modulation technique is represented by M, the number of coded bits constituting one symbol becomes $\log_2 M$. Shown in Table 1 are modulation techniques used in the AMCS and the numbers of bits constituting one symbol.

TABLE 1

| modulation type (M) | number of bits constituting one symbol ($\log_2 M$) |
|---|---|
| QPSK | 2 |
| 16QAM | 4 |
| 64QAM | 6 |

The channel demultiplexer 118 demultiplexes a symbol received from the modulator 116 into as many symbols as the number of multiple codes assigned by the controller 122 for high-speed data symbol transmission at a data rate determined by the controller 122. A spreader 120 spreads the demultiplexed symbols from the channel demultiplexer 118 with the assigned multiple codes. The multiple codes may include Walsh codes for identifying channels. When a fixed chip rate and a fixed spreading factor (SF) are used in the high-speed packet transmission system, the rate of symbols transmitted with one Walsh code is constant. Therefore, in order to use the determined data rate, it is necessary to use multiple Walsh codes. For example, when a system, using a chip rate of 3.84 Mcps and an SF of 16 chips/symbol, uses 16QAM and a channel coding rate of ¾, a data rate that can be provided with one Walsh code becomes 1.08 Mbps. Therefore, when 10 Walsh codes are used, it is possible to transmit data at a data rate of a maximum of 10.8 Mbps.

FIG. 3 illustrates a structure of a receiver corresponding to the transmitter of FIG. 1. Referring to FIG. 3, a despreader 312 despreads received data according to information on the multiple codes in use, the information being provided through signaling. A channel multiplexer 314 multiplexes the despread received data and provides its output to a demodulator 316. The demodulator 316 performs demodulation corresponding to the modulation used by the transmitter, and provides LLR (Log Likelihood Ratio) values for the symbols to a deinterleaver 318. The deinterleaver 318, having a structure corresponding to that of the interleaver 114 of FIG. 1, performs deinterleaving on the demodulated data and restores the original data sequence. The deinterleaved data is provided to a combiner 320, where it is combined with the same previously received data in a bit unit. If CC is used as the HARQ, the same data is transmitted at each retransmission. In this case, since combining can be performed using one buffer, a buffer controller 322 is unnecessary. However, if IR is used as the HARQ, a different redundancy packet may be transmitted at retransmission, so the buffer controller 322 is necessary. The buffer controller 322 properly assigns buffers in the combiner 320 to the received data so that the received data can be combined with the same previously received data. An output of the combiner 320 is provided to a channel decoder 324. The channel decoder 324 performs decoding on the output of the combiner 320, checks a CRC error for the received data, and transmits a NACK or ACK signal to a transmitter according to the CRC check result. Upon receiving the NACK signal from the receiver, the transmitter performs the re-transmission process according to the HARQ. However, upon receiving the ACK signal from the receiver, the transmitter begins transmission of a new data packet.

In the transmitter of the high-speed packet transmission system of FIG. 1, it is assumed that the AMCS defined by the controller 122 at initial transmission of a data packet according to a channel environment is applied even during retransmission without modification. However, as described above, a high-speed data transmission channel may subject to a change in channel environment even for an HARQ period due to the change in the number of UEs in a cell and the Doppler shift. Therefore, maintaining the modulation technique and the coding rate used at the initial transmission contributes to a reduction in the system performance. For this reason, the ongoing HSDPA and 1xEV-DV standardizations consider using the AMCS even at retransmission.

As an example, a new technique capable of changing both a modulation technique and a coding rate at retransmission has been proposed. Commonly, the size of transmittable data is changed according to a modulation technique and a coding rate, so the proposed new technique enables transmission of data by changing TTI (Time To Interleaving), a minimum unit of processing packet data. Therefore, the new technique is advantageous in that it can adjust to variations in the channel environment. However, the use of the variable TTI increases complexity of realization and signaling. Further, this technique supports only the IR among the HARQ types.

As another example, in a system wherein CC is used as the HARQ and a coding rate at retransmission is identical to a coding rate at initial transmission, if the number of available codes changes, another proposed technique changes a modulation technique for the retransmission to adapt to the change, and retransmits a part or all of the initially transmitted packet according to the changed modulation technique. Meanwhile, a receiver partially combines the retransmitted partial packet with the initially transmitted full packet, resulting in a decrease in the entire BER of a decoder. This technique, as it uses a fixed TTI and has a characteristic of partial Chase combining, is advantageous in that its realization and signaling is simple. Although this technique can decrease BER by retransmitting an unspecified part of the randomly interleaved data and combining the retransmitted partial data with the initially transmitted full packet, an improvement in a frame error rate (FER) is restrictive. In addition, this technique can support only CC among the HARQ types.

Therefore, in a communication system based on a fixed TTI, there have been demands for one method for changing a modulation technique during retransmission regardless of the HARQ type in use even though the number of available codes remains unchanged, and another method for improving system performance by properly selecting a transmission packet according to the changed modulation technique.

SUMMARY OF THE INVENTION

It is, therefore, an object of the present invention to provide a data transceiver apparatus and method for improving performance of a radio communication system.

It is another object of the present invention to provide in a receiver for a mobile communication system a transceiver apparatus and method for receiving bits at higher probability.

It is further another object of the present invention to provide in a transmitter for a high-speed radio communication system supporting AMCS and HARQ an apparatus and method for obtaining a performance gain of a system by changing only a modulation technique during retransmission while maintaining the same coding rate as used during initial transmission.

It is yet another object of the present invention to provide in a transmitter for a high-speed radio communication system supporting AMCS and HARQ an apparatus and method for obtaining a performance gain of a system by selectively retransmitting a data sub-packet divided into systematic bits or parity bits according to a modulation technique needed during retransmission.

It is still another object of the present invention to provide in a receiver for a high-speed radio communication system an apparatus and method for obtaining a performance gain by selectively soft-combining a data packet selectively retransmitted by a modulation technique required by a transmitter with an initially transmitted data packet or by using transmitted redundancy.

In accordance with a first aspect of the present invention, there is provided a method for retransmitting coded bits by a transmitter in response to a retransmission request from a receiver in a mobile communication system which determines transmission coded bits by puncturing coded bits output from an encoder at a given mother coding rate according to a predetermined puncturing pattern, and transmits a stream of symbols obtained by symbol-mapping the determined coded bits by a given modulation technique, from the transmitter to the receiver. The method comprises determining a modulation technique to be used at retransmission as a modulation technique having a lower modulation order than a modulation technique used at initial transmission; determining a puncturing pattern according to an HARQ (Hybrid Automatic Repeat Request) type, and selecting as many coded bits as the number of coded bits that can be symbol-mapped by the determined modulation technique, among the coded bits punctured by the determined puncturing pattern; and symbol-mapping the selected coded bits by the determined modulation technique, and transmitting the symbol-mapped coded bits to the receiver.

In accordance with a second aspect of the present invention, there is provided a method for retransmitting coded bits by a transmitter in response to a retransmission request from a receiver in a mobile communication system which determines transmission coded bits by puncturing coded bits output from an encoder at a given mother coding rate according to a predetermined puncturing pattern, and transmits a stream of symbols obtained by symbol-mapping the determined coded bits by a given modulation technique, from the transmitter to the receiver. The method comprises determining a modulation technique to be used at retransmission as a modulation technique having a lower modulation order than a modulation technique used at initial transmission; distributing the transmission coded bits punctured by a puncturing pattern corresponding to an HARQ type into a plurality of streams of sub-packets having a given size, and selecting as many sub-packets as the number of coded bits that can be symbol-mapped by the determined modulation technique among the streams of sub-packets; and symbol-mapping coded bits constituting the selected sub-packets by the determined modulation technique and transmitting the symbol-mapped coded bits to the receiver.

BRIEF DESCRIPTION OF THE DRAWINGS

The above and other objects, features, and advantages of the present invention will become more apparent from the following detailed description when taken in conjunction with the accompanying drawings in which:

FIG. 7 illustrates a method of selecting transmission data packets by the transmitter of FIG. 4 or FIG. 5 during retransmission, when a coding rate is ½ and PIR is used as HARQ;

FIG. 8 illustrates a method of selecting transmission data packets by the transmitter of FIG. 4 or FIG. 5 during retransmission, when a coding rate is ¾ and PIR is used as HARQ;

FIG. 9 illustrate a method of selecting transmission data packets by the transmitter of FIG. 4 or FIG. 5 during retransmission, when a coding rate is ½ and FIR is used as HARQ;

FIG. 10 illustrate a method of selecting transmission data packets by the transmitter of FIG. 4 or FIG. 5 during retransmission, when a coding rate is ¾ and FIR is used as HARQ;

FIG. 11A illustrates a method of selecting transmission data packets by the transmitter of FIG. 4 or FIG. 5 during retransmission, when a coding rate is ½ and CC is used as HARQ;

FIG. 11B illustrates a method of selecting transmission data packets by the transmitter of FIG. 4 or FIG. 5 during retransmission, when a coding rate is ¾ and CC is used as HARQ;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a data transceiver apparatus and method for improving reliability of transmission data in a CDMA mobile communication system. In particular, the invention provides several embodiments of a data transceiver apparatus and method for improving system performance by allowing a change in a modulation technique during retransmission and controlling a transmission data packet according to a changed modulation technique in a high-speed packet data transmission system supporting AMCS and HARQ.

Herein, a detailed description will be made of an apparatus and method for allowing a change in a modulation technique during retransmission regardless of the HARQ type in use even though the number of available codes remains unchanged, in a communication system based on a fixed TTI. In addition, a detailed description will be made of an apparatus and method for improving system performance by properly selecting a transmission packet according to a changed modulation technique. That is, reference will be made to an apparatus and method for using a modulation technique having a modulation order lower than the modulation technique used at initial transmission at a retransmission request from a UE, rather than maintaining the modulation technique used at the initial transmission, and properly selecting a part of transmittable data packets according to the changed modulation technique.

Now, a detailed description of the present invention will be made with reference to the accompanying drawings.

Although the present invention provides several embodiments, only two of them will be described herein for simplicity. The present invention will be described with reference to different embodiments where a channel encoder supports a coding rate of ½ and ¾, and a modulator supports a modulation technique of QPSK and 16QAM. For example, the modulator uses 16QAM at initial transmission and changes the modulation technique to QPSK at retransmission. Of course, if the modulator used the modulation technique of 64QAM at initial transmission, it will use a modulation technique of 16QAM at retransmission. In addition, the embodiments may be applied to all HARQ types.

First Embodiment of Transmitter

Figure 1:
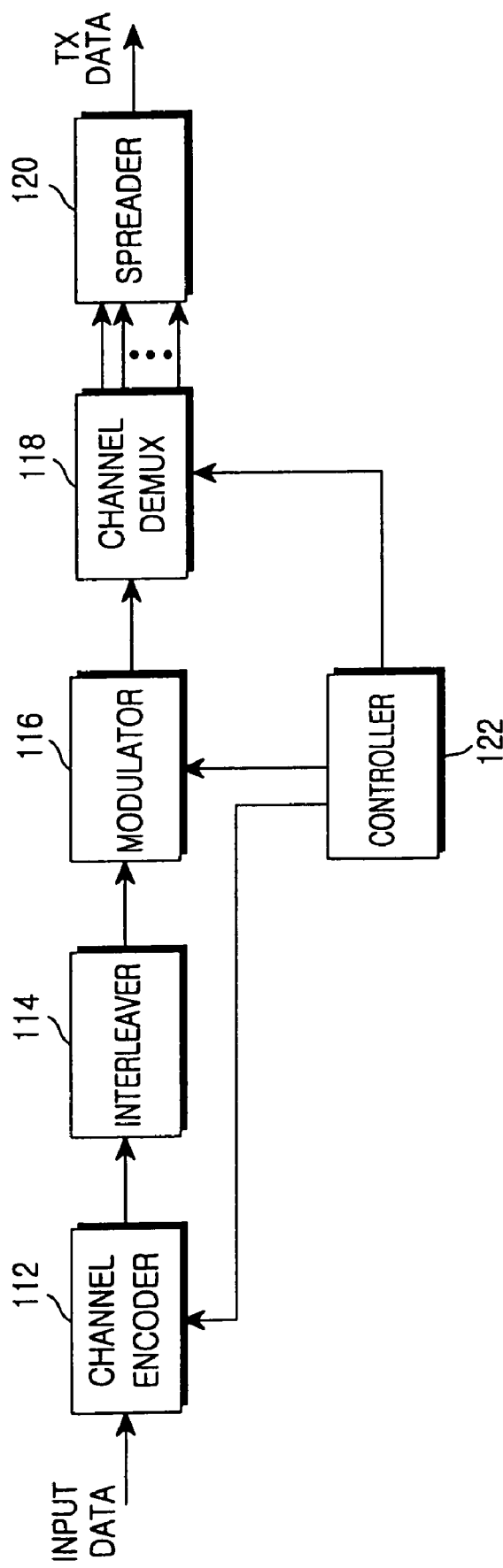
FIG. 1 illustrates a structure of a transmitter in a conventional CDMA mobile communication system for high-speed data transmission.
Figure 2:
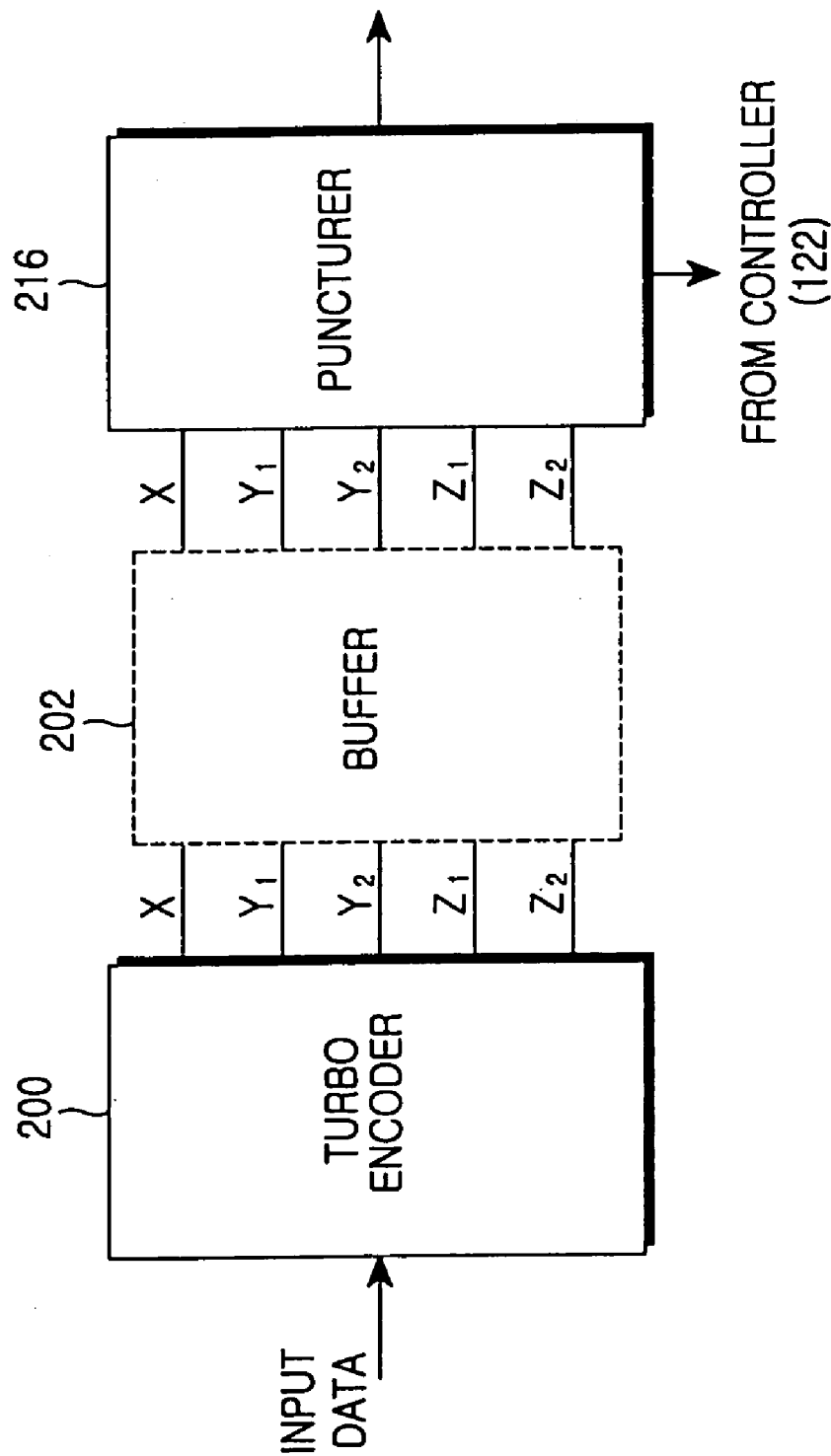
FIG. 2 illustrates a detailed structure of the channel encoder in FIG. 1.
Figure 4:
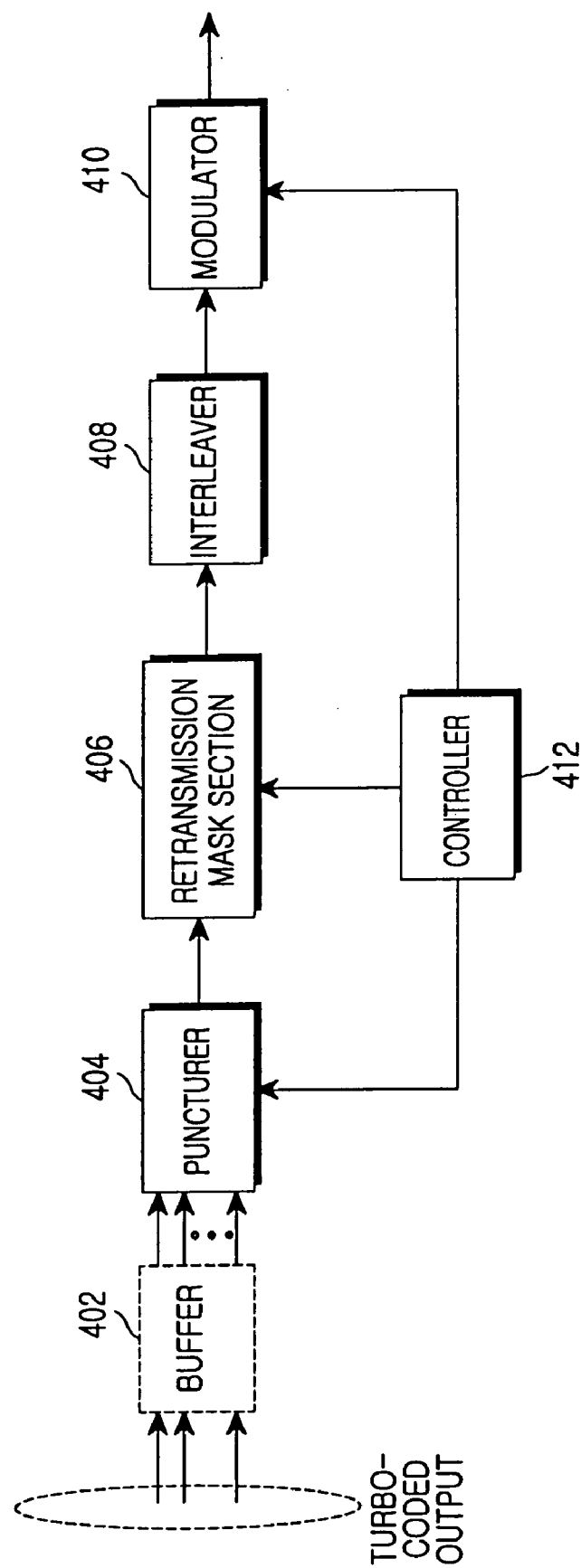
FIG. 4 illustrates a structure of a transmitter in a CDMA mobile communication system according to an embodiment of the present invention.

FIG. 4 illustrates a structure of a transmitter in a CDMA mobile communication system according to an embodiment of the present invention. Though not shown, a turbo encoder, a channel demultiplexer and a spreader in the transmitter of FIG. 4 have the same structure and operation as the corresponding elements in the transmitters of FIGS. 1 and 2, so a detailed description thereof will not be provided.

Referring to FIG. 4, coded bits generated by encoding input data at a mother coding rate of a turbo encoder (not shown) are stored in a buffer 402. The coded bits are properly punctured by a puncturer 404 according to information on a coding rate and a selected HARQ type, provided from a controller 412. The puncturer 404 uses a puncturing pattern for puncturing the coded bits according to the HARQ type. For example, if the HARQ type is CC, the puncturing pattern used at retransmission will be identical to the modulation technique use at initial transmission. However, if the HARQ type is PIR or FIR, the puncturing pattern used at retransmission will be different from the modulation technique use at initial transmission. If the HARQ type is PIR, the puncturer 404 uses a retransmission puncturing pattern for outputting initially transmitted systematic bits and new parity bits. If the HARQ type is FIR, the puncturer 404 uses a retransmission puncturing pattern for outputting only the new parity bits. However, the number of coded bits output from the puncturer 404 is constant at both initial transmission and retransmission. Since the number of the coded bits may be different from the number of data bits to be finally transmitted in a physical layer, rate matching must be performed after the puncturing in order to match the numbers. For simplicity, the rate matching will not be described herein. The output of the puncturer 404 is data having the size corresponding to the coding rate and a modulation technique determined during initial transmission, and the coded bits output from the turbo encoder are punctured according to the HARQ.

A retransmission mask section 406 again selects a part of the punctured coded bits. For example, at initial transmission, the retransmission mask section 406 provides the intact coded bits from the puncturer 404 to an interleaver 408. This is because at the initial transmission, the coded bits to be transmitted were previously determined by the puncturer 404. However, when the modulation technique is changed during retransmission, the retransmission mask section 406 selects only a part of the coded bits provided from the puncturer 404 according to the changed modulation technique. In particular, when a low-order modulation technique is used during retransmission according to an embodiment of the present invention, an amount of data that can be retransmitted is decreased. Therefore, the retransmission mask section 406 must select a part of the coded bits output from the puncturer 404 according to the changed modulation technique. The present invention provides a method for selecting coded bits from the puncturer 404 based on the previously determined HARQ type and the changed modulation technique. For example, the retransmission mask section 406, under the control of the controller 412, generates a given mask function and masks the coded bits from the puncturer 404 according to the generated mask function, thereby outputting desired coded bits.

The coded bits output from the retransmission mask section 406 are provided to a modulator 410 after being interleaved by the interleaver 408.

The modulator 410 performs modulation on the coded bits from the interleaver 408 according to the changed modulation technique during retransmission. For example, the modulator 410 modulates the coded bits by 16QAM at initial transmission, and modulates the coded bits by QPSK at retransmission. If the modulation technique used at initial transmission is 64QAM, the modulation technique used at retransmission will be 16QAM. Therefore, although one symbol is comprised of 4 coded bits at initial transmission, one symbol is comprised of 2 coded bits at retransmission. As a result, only one half of the coded bits transmitted at the initial transmission are transmitted during retransmission.

In FIG. 4, the puncturer 404 for puncturing the coded bits generated at a mother coding rate and the retransmission mask section 406 for selectively outputting the coded bits from the puncturer 404 are physically separated. However, the mask retransmission section 406 can be combined with the puncturer 404. In this case, the combined structure must be properly controlled to select the coded bits according to the changed modulation technique during retransmission.

Figure 3:
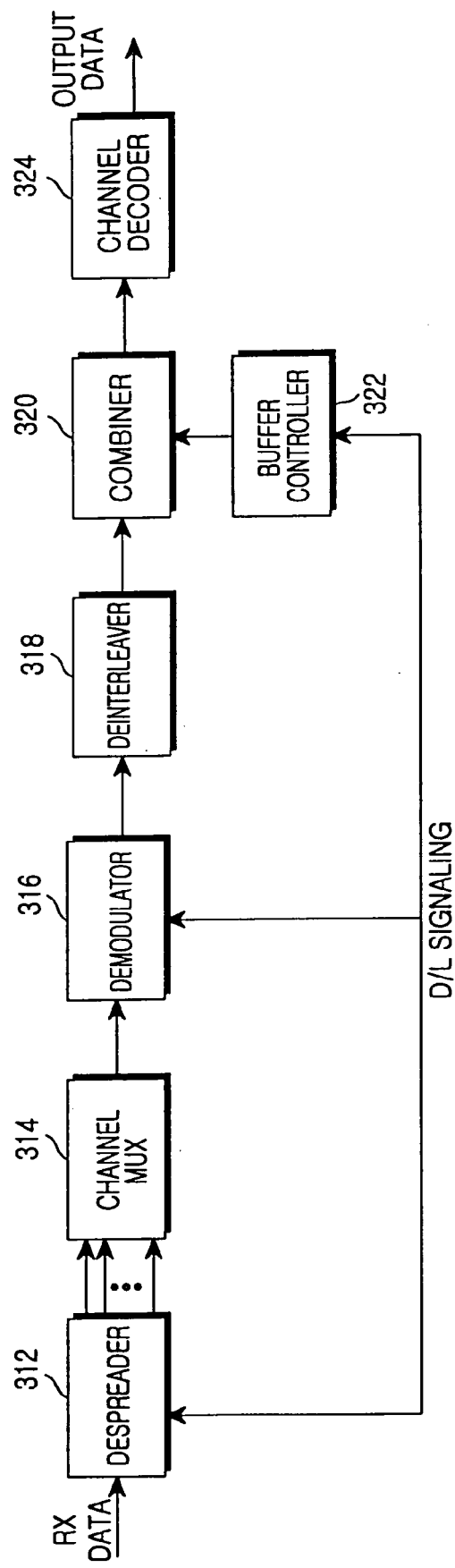
FIG. 3 illustrates a structure of a receiver corresponding to the transmitter of FIG. 1.

The conventional receiver illustrated in FIG. 3 can be used as a receiver corresponding to the transmitter of FIG. 4. That is, the data transmitted by a predetermined HARQ type can be stored or combined under the control of the buffer controller 322, regardless whether the HARQ type is CC or IR. Here, the buffer controller 322 of the receiver must recognize information on the coding rate, the modulation technique and the HARQ type, used by the transmitter. In some cases, the buffer controller 322 needs information on the number of retransmissions and a redundancy number.

Figure 12:
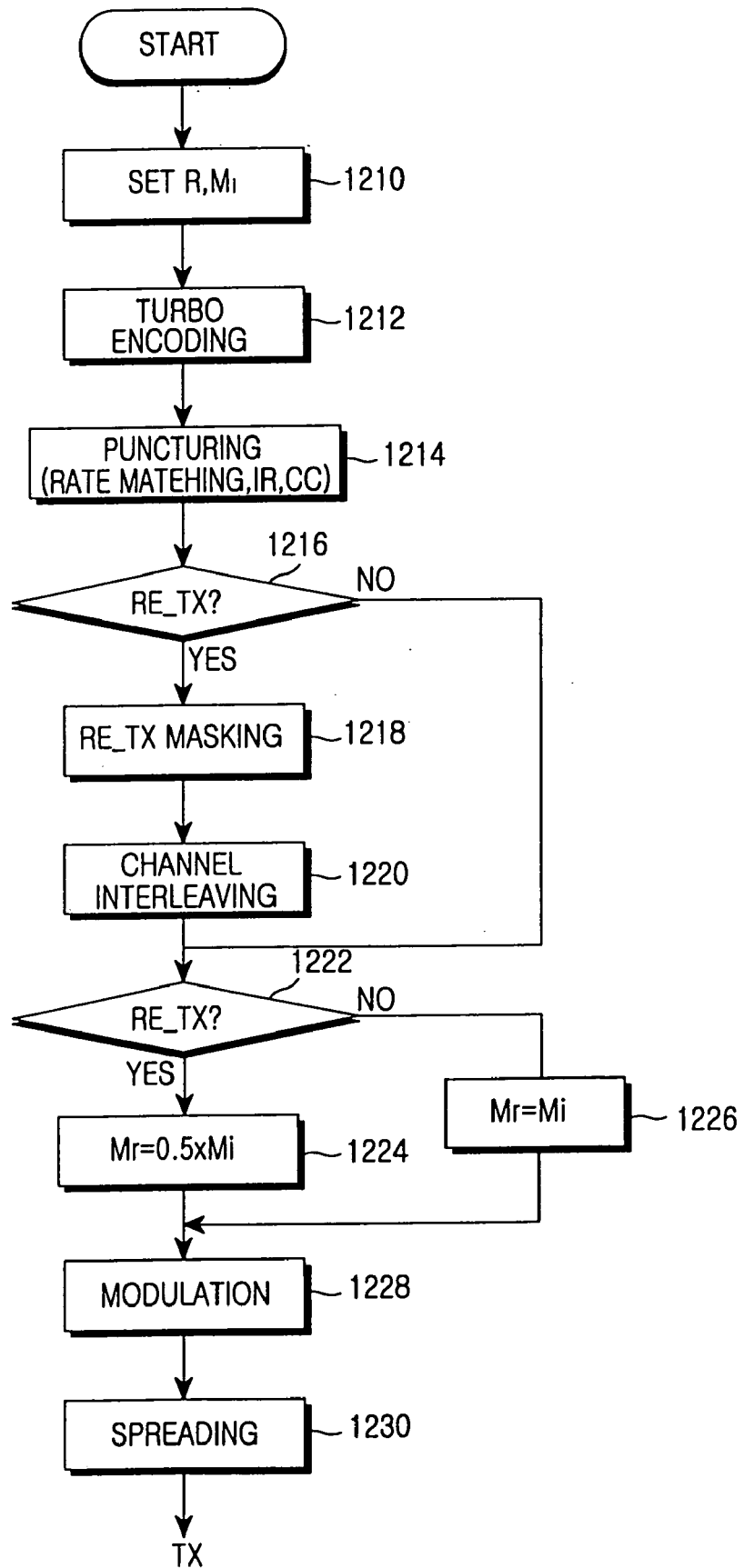
FIG. 12 illustrates a process of transmitting data packets by a changed modulation technique in the transmitter of FIG. 4.

FIG. 12 illustrates a transmission process for retransmission by a changed modulation technique during retransmission in a CDMA mobile communication system according to an embodiment of the present invention. The transmission process of FIG. 12 is performed by the transmitter of FIG. 4.

In FIG. 12, when a coding rate and a modulation technique are properly determined by an upper layer at initial transmission, the turbo encoder performs encoding accordingly and performs puncturing according to a puncturing pattern determined based on the selected coding rate and HARQ type.

Referring to FIG. 12, in step 1210, the transmitter determines a coding rate R to be used at initial transmission or retransmission, and an amount $M_i$ of data transmitted at initial transmission. After determining the R and the $M_i$, the transmitter channel-encodes, in step 1212, transmission data at a mother coding rate and outputs coded bits. After the encoding, the transmitter punctures the coded bits by a predetermined puncturing pattern in step 1214. The puncturing pattern can be determined according to the HARQ type used at initial transmission or retransmission. Further, an operation in step 1214 includes rate matching. The transmitter determines in step 1216 whether the current transmission is initial transmission or retransmission (Re_Tx). If it is determined in step 1216 that the current transmission is retransmission, the transmitter selects, in step 1218, a part of the coded bits punctured according to the determined $M_i$ and the modulation technique determined to be used at retransmission. This operation is called a masking process. If the masking process is completed or the current transmission is initial transmission, the transmitter proceeds to step 1220 where the punctured coded bits or the masked coded bits are channel-interleaved. After the channel interleaving, the transmitter again determines in step 1222 whether the current transmission is retransmission. If it is determined that the current transmission is retransmission, the transmitter proceeds to step 1224. Otherwise, if it is determined that the current transmission is initial transmission, the transmitter proceeds to step 1226. In step 1224, as a low-order modulation technique is used at the retransmission, the transmitter sets an amount $M_r$ of data that can be transmitted to a half of the $M_i$, i.e., $M_i \times 0.5$. Here, a constant multiplied by the $M_i$ to determine the $M_r$ can be defined as a ratio of the number of bits that can be mapped per symbol by the previously used modulation technique to the number of bits that can be mapped per symbol by the selected modulation technique. The constant "0.5" means that the number of coded bits that can be mapped to one symbol is reduced to one half due to the change in the modulation technique. However, in step 1226, the transmitter sets the $M_r$ to $M_i$. After determining the $M_r$, the transmitter performs modulation on the selected coded bits in step 1228. The modulation is performed through symbol mapping according to the determined modulation technique. After the modulation, the transmitter spreads, in step 1230, the modulated signal with multiple Walsh codes and transmits the spread signal to a receiver.

To sum up, at initial transmission, the transmitter performs channel interleaving on the intact punctured coded bits, modulates the interleaved coded bits by symbol mapping based on the determined modulation technique, and frequency-spreads the modulated coded bits using predetermined Walsh codes. However, at retransmission, the transmitter re-punctures the punctured coded bits according to the determined modulation technique before interleaving, and modulates the interleaved coded bits using a modulation technique having a one-step lower modulation order than the modulation technique used at the initial transmission.

Second Embodiment of Transmitter

Figure 5:
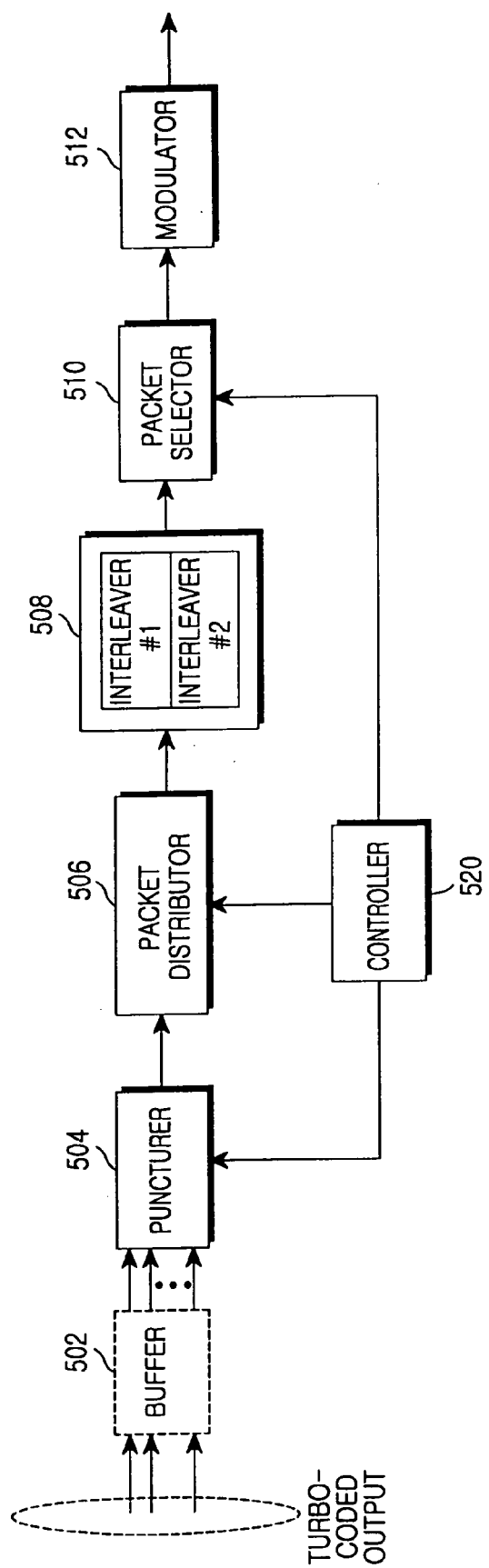
FIG. 5 illustrates a structure of a transmitter for a CDMA mobile communication system according to another embodiment of the present invention.

FIG. 5 illustrates a structure of a transmitter for a CDMA mobile communication system according to another embodiment of the present invention. Like the embodiment shown in FIG. 4, FIG. 5 also shows only the elements arranged between the buffer and the modulator in the transmitter.

Referring to FIG. 5, coded bits generated by encoding input data at a mother coding rate of a turbo encoder (not shown) are stored in a buffer 502. The coded bits are properly punctured by a puncturer 504 according to information on a coding rate and a selected HARQ type, provided from a controller 520. The puncturer 504 uses a puncturing pattern for puncturing the coded bits according to the HARQ type. When the HARQ type is CC or PIR, an output of the puncturer 504 is comprised of a systematic sub-packet having only the systematic bits and a parity sub-packet having only the parity bits at each transmission. Here, when the HARQ type is CC, the parity sub-packet output from the puncturer 504 remains unchanged at both initial transmission and retransmission. However, when the HARQ type is PIR, the parity sub-packet at initial transmission is different from the sub-packet at retransmission. In addition, when the HARQ type is FIR, the puncturer 504 outputs a systematic sub-packet and a parity sub-packet at initial transmission, and outputs only a different parity sub-packet at retransmission. The sub-packet can be defined as a coded bit stream with a specified size, comprised of systematic bits or parity bits.

A packet distributor 506 distributes sub-packets from the puncturer 504 to a plurality of interleavers 508 according to a coding rate. For example, if the coding rate is ½, a systematic sub-packet is identical in size to a parity sub-packet (at each transmission in CC and PIR, and at initial transmission in FIR), or two different parity sub-packets are identical to each other in size (at retransmission in FIR), so the packet distributor 506 distributes the sub-packets to the interleavers 508. However, when the coding rate is ¾, the size of a systematic sub-packet is 3 times greater than the size of a parity sub-packet (at each transmission in CC and PIR, and at initial transmission in FIR), the packet distributor 506 separately distributes the systematic sub-packets and the parity sub-packets. In the case of retransmission by the FIR, since a transmission packet is comprised of only the parity sub-packet, the parity sub-packet may be uniformly divided for distribution. The sub-packets distributed by the packet distributor 506 are independently interleaved by the interleavers 508, and then provided to a packet selector 510. Herein, although the interleavers 508 are physically separated into two interleavers, they need not be separated physically. In this case, a single interleaver can be logically separated by simply modifying its read/write mechanism.

The packet selector 510 determines an amount of retransmission data based on information about a modulation technique used at initial transmission, a modulation technique to be used at retransmission, and the number of retransmissions, and then selects coded bits from the first interleaver and the second interleaver according to the determined data amount. The coded bits selected by the packet selector 510 are provided to a modulator 512. During retransmission, the packet selector 510 outputs only the systematic bits or only the parity bits, or outputs the systematic bits and the parity bits in combination. Examples of a packet selecting pattern by the packet selector 510 are illustrated in FIGS. 7 to 11. A detailed description of the packet selecting pattern will be given later. The coded bits output from the packet selector 510 are mapped into a symbol by symbol mapping according to the determined modulation technique, and spread using predetermined multiple codes before being transmitted.

The controller 520 controls operation of each element in the transmitter according to an embodiment of the present invention. First, the controller 520 determines a coding rate and a modulation technique based on information about the current channel environment of a downlink transmitted by the receiver during initial transmission, and controls the encoder to encode transmission data at the determined coding rate. In addition, the controller 520 controls the packet selector 510 and the modulator 512 according to the determined modulation technique. The controller 520 controls a channel demultiplexer (not shown) by determining the number of necessary Walsh codes based on the determined coding rate and modulation technique.

Figure 13:
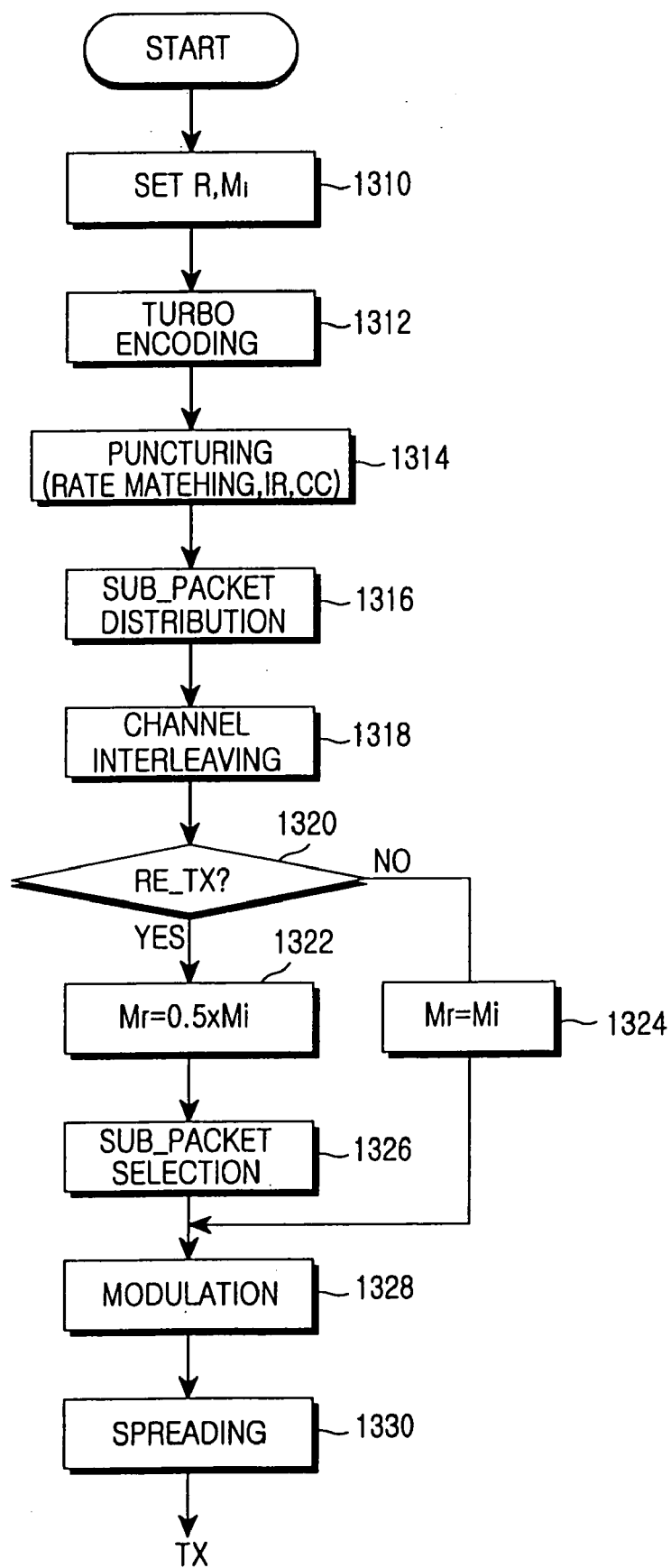
FIG. 13 illustrates a process of transmitting data packets by a changed modulation technique in the transmitter of FIG. 5.

FIG. 13 illustrates a transmission process for retransmission by a changed modulation technique during retransmission in a CDMA mobile communication system according to an embodiment of the present invention. The transmission process of FIG. 13 is performed by the transmitter of FIG. 5.

In FIG. 13, when a coding rate and a modulation technique are properly determined by an upper layer at initial transmission, the turbo encoder performs encoding accordingly and performs puncturing according to a puncturing pattern determined based on the selected coding rate and HARQ type.

Referring to FIG. 13, in step 1310, the transmitter determines a coding rate R to be used at initial transmission or retransmission, and an amount $M_i$ of data transmitted at initial transmission. After determining the R and the $M_i$, the transmitter channel-encodes, in step 1312, transmission data at a mother coding rate and outputs coded bits. After the encoding, the transmitter punctures the coded bits according to a predetermined puncturing pattern in step 1314. The puncturing pattern can be determined according to the HARQ type used at initial transmission or retransmission. Further, an operation in step 1314 includes rate matching. In step 1316, the transmitter distributes the coded bits into a systematic sub-packet comprised of systematic bits and a parity sub-packet comprised of parity bits. After the distribution of the coded bits, the transmitter channel-interleaves the distributed systematic sub-packet and parity sub-packet, in step 1318. After the channel interleaving, the transmitter determines in step 1320 whether the current transmission is retransmission. If the current transmission is retransmission, the transmitter proceeds to step 1322. Otherwise, if the current transmission is initial transmission, the transmitter proceeds to step 1324. In step 1324, the transmitter sets the $M_r$ to the $M_i$ and then proceeds to step 1330.

In step 1322, the transmitter sets an amount $M_r$ of data that can be transmitted during retransmission to a half of the $M_i$, i.e., $M_i \times 0.5$. This is because the modulation technique used at retransmission has a lower modulation order than the modulation technique used at initial transmission and an amount of data that can be transmitted by the lower-order modulation technique is reduced. After determining the $M_r$ in step 1322, the transmitter selects sub-packets to be transmitted among the sub-packets output from the channel interleaver in step 1326. Exemplary methods of selecting the sub-packets to be transmitted will be described later. After selecting the sub-packets to be transmitted, the transmitter performs, in step 1328, modulation on the sub-packets determined by the step 1324 or the sub-packets selected in step 1326. The modulation is performed through symbol mapping corresponding to the determined modulation technique. After the modulation, the transmitter spreads, in step 1330, the modulated signal with multiple Walsh codes and transmits the spread signal to a receiver.

To sum up, the punctured data output by the step 1314 can be separated into a systematic sub-packet and a parity sub-packet, or different parity sub-packets according to the HARQ type, and the transmitter properly distributes the sub-packets to two channel interleavers and separately interleaves the distributed sub-packets. At initial transmission, the full interleaved data is modulated by a previously determined modulation technique. Here, the performance can be improved by a symbol mapping method. However, at retransmission, an amount of data that can be retransmitted is reduced due to a change in the modulation technique to a modulation technique having a one-step lower modulation order, so sub-packets must be properly selected according to the changed modulation technique and the determined HARQ type.

First Embodiment of Receiver

Figure 6:
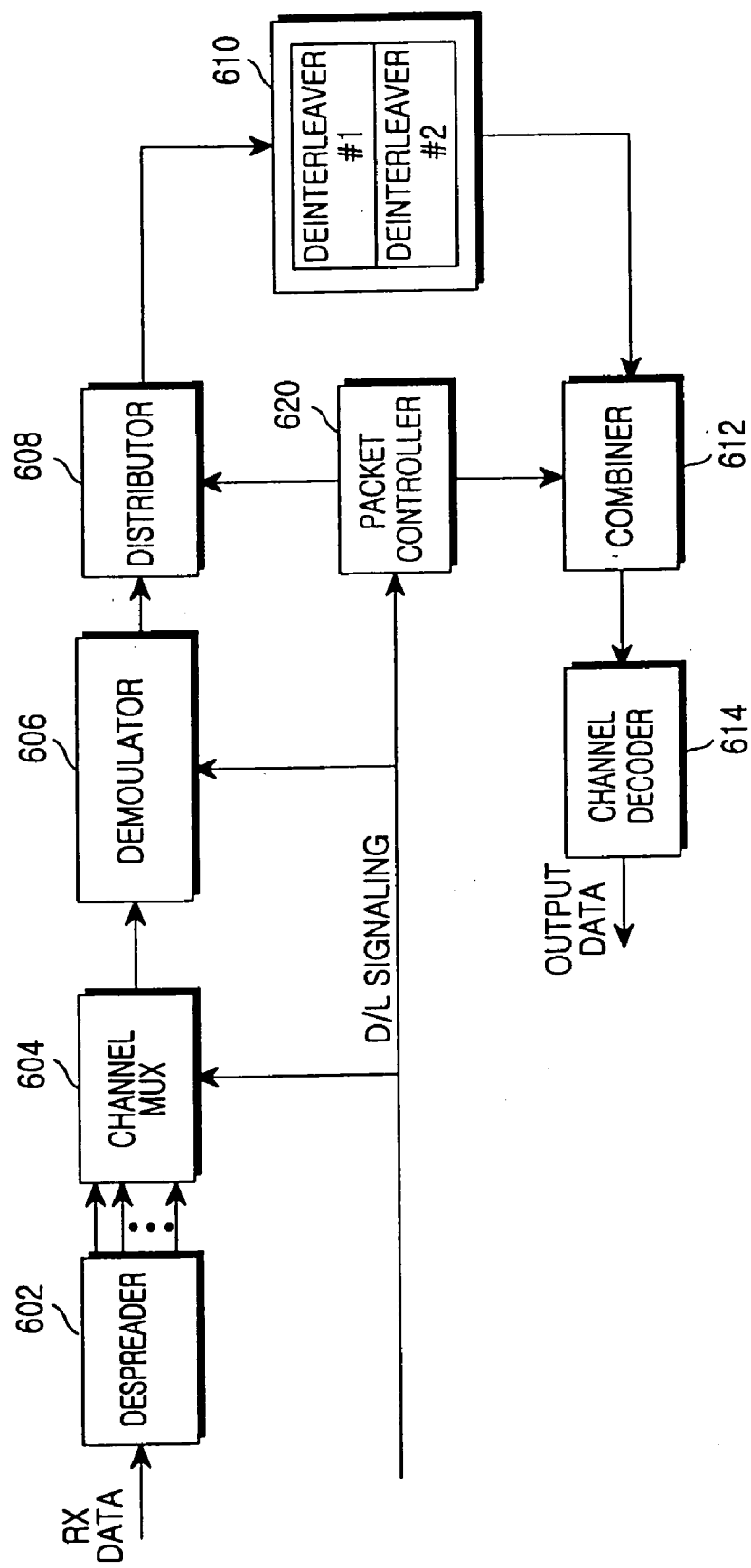
FIG. 6 illustrates a structure of a receiver corresponding to the transmitter of FIG. 5, according to an embodiment of the present invention.

FIG. 6 illustrates a structure of a receiver corresponding to the transmitter of FIG. 5, according to an embodiment of the present invention. In FIG. 6, a despreader 602, a demodulator 606 and a controller 620 are provided with information on a coding rate, a modulation technique, a Walsh code used, a redundancy packet number, and the number of retransmissions over a downlink control channel, and the elements perform the following operations based on the provided information.

Referring to FIG. 6, a received data symbol, which was frequency-spread by the transmitter of FIG. 5 with multiple Walsh codes before being transmitted, is despread into a plurality of transmission symbol streams by a despreader 602 with the multiple Walsh codes used by the transmitter. The receiver can be provided with the multiple Walsh codes used in the transmitter based on Walsh code information signaled over a downlink channel. The transmission symbol streams despread by the despreader 602 are multiplexed into one transmission symbol stream by a channel multiplexer 604, and the multiplexed transmission symbol stream is provided to a demodulator 606. The demodulator 606 performs demodulation on the transmission symbol stream by a demodulation technique corresponding to the modulation technique signaled over the downlink channel. The demodulator 606 outputs LLR values for the demodulated symbols.

A distributor 608 distributes the LLR values of the symbols demodulated by the demodulator 606 to corresponding deinterleavers 610 according to a decision by a packet controller 620 on the input data characteristic (systematic sub-packet or parity sub-packet, or a combination of the systematic sub-packet and the parity sub-packet). The deinterleavers 610 correspond to the interleavers 508 in the transmitter of FIG. 5, and are comprised of two independent deinterleavers. The first and second deinterleavers de-interleave the systematic bits and the parity bits provided from the distributor 608. Since a deinterleaving pattern used by the deinterleavers 610 has a reverse order of the interleaving pattern used in the interleaver 508 of FIG. 5, the interleaving pattern information must be previously provided to the receiver. As described with reference to the transmitter, the deinterleavers 610 need not be physically separated, and can be logically separated. Therefore, the full size is constant.

A packet combiner 612 can be comprised of a buffer having the same size as a maximum permitted redundancy packet when FIR is used as the HARQ. That is, the buffer has a size great enough to store one systematic sub-packet and a plurality of parity sub-packets. When data having the same characteristic is distributed by the distributor 608 at each retransmission, the retransmitted data is combined with the data stored in the corresponding buffer. However, if the modulation technique is changed during retransmission, the size of retransmitted data is also changed, so it is possible to decrease a required size of the buffer. If FIR or PIR is selected as the HARQ, the frequency of using a buffer for the parity sub-packet is further decreased, and if CC is selected as the HARQ, only the buffer for the systematic sub-packet will be used. Here, since the retransmitted systematic sub-packet or partial parity sub-packet was modulated by a low-order modulation technique, reliability of data is remarkably increased as compared with during the initial transmission. Therefore, although the data is partially combined, the combining effect may appear very high. In conclusion, the output of the packet combiner 612 improves decoding performance of a channel decoder 614, thus increasing throughput of the system.

The packet controller 620 controls the distributor 608 according to information on the HARQ type used by the transmitter, a redundancy number and the number of retransmissions so that the demodulated data can be properly deinterleaved. In addition, the packet controller 620 controls the packet combiner 612 so that combining between corresponding packets can be performed by the packet combiner 612.

The channel decoder 614 can be divided into a decoder and a CRC checker according to its function. The decoder receives coded bits comprised of the systematic bits and the parity bits output from the packet combiner 612, and outputs desired bits by decoding the coded bits by a predetermined decoding technique. A technique for receiving the systematic bits and the parity bits and decoding the systematic bits is used as the predetermined decoding technique. The decoding technique is determined according to the coding technique used by the transmitter. As to the decoded output bits from the decoder, a CRC added by the transmitter during data transmission is checked to determine whether an error occurs in the decoded bits. If it is determined that no error occurs in the decoded bits, the channel decoder 614 outputs the decoded bits and transmits to the transmitter a response signal ACK for acknowledging receipt of the bits. However, if it is determined that an error occurs in the decoded bits, the channel decoder 614 transmits to the transmitter a response signal NACK for requesting retransmission of the bits. The buffer in the packet combiner 612 is either initialized or maintains the current state according to the transmitted response signal ACK/NACK. That is, when the ACK signal is transmitted, the buffer is initialized to receive new packet, and when the NACK signal is transmitted, the buffer maintains its current state to prepare for combining with a retransmitted packet.

Before a detailed description of preferred embodiments of the present invention, a brief description will be made of the embodiments herein below.

A first embodiment proposes a transmitter and a receiver for supporting a modulation technique having a lower modulation order than the modulation technique used at initial transmission during retransmission in a CDMA mobile communication system supporting a coding rate of ½ and the PIR-type HARQ. For example, 16QAM is used as a modulation technique for initial transmission, and QPSK is used as a modulation technique for retransmission. Specifically, this embodiment proposes a method for selecting transmission data according to the changed modulation technique during retransmission, and a method for efficiently combining the transmitted data.

A second embodiment proposes a transmitter and a receiver for supporting a modulation technique having a lower modulation order than the modulation technique used at initial transmission during retransmission in a CDMA mobile communication system supporting a coding rate of ¾ and the PIR-type HARQ. For example, 16QAM is used as a modulation technique for initial transmission, and QPSK is used as a modulation technique for retransmission. Specifically, this embodiment proposes a method for selecting transmission data according to the changed modulation technique during retransmission, and a method for efficiently combining the transmitted data.

A third embodiment proposes a transmitter and a receiver for supporting a modulation technique having a lower modulation order than the modulation technique used at initial transmission during retransmission in a CDMA mobile communication system supporting a coding rate of ½ and the FIR-type HARQ. For example, 16QAM is used as a modulation technique for initial transmission, and QPSK is used as a modulation technique for retransmission. Specifically, this embodiment proposes a method for selecting transmission data according to the changed modulation technique during retransmission, and a method for efficiently combining the transmitted data.

A fourth embodiment proposes a transmitter and a receiver for supporting a modulation technique having a lower modulation order than the modulation technique used at initial transmission during retransmission in a CDMA mobile communication system supporting a coding rate of ¾ and the FIR-type HARQ. For example, 16QAM is used as a modulation technique for initial transmission, and QPSK is used as a modulation technique for retransmission. Specifically, this embodiment proposes a method for selecting transmission data according to the changed modulation technique during retransmission, and a method for efficiently combining the transmitted data.

A fifth embodiment proposes a transmitter and a receiver for supporting a modulation technique having a lower modulation order than the modulation technique used at initial transmission during retransmission in a CDMA mobile communication system supporting a coding rate of ½ and the CC-type HARQ. For example, 16QAM is used as a modulation technique for initial transmission, and QPSK is used as a modulation technique for retransmission. Specifically, this embodiment proposes a method for selecting transmission data according to the changed modulation technique during retransmission, and a method for efficiently combining the transmitted data.

A sixth embodiment proposes a transmitter and a receiver for supporting a modulation technique having a lower modulation order than the modulation technique used at initial transmission during retransmission in a CDMA mobile communication system supporting a coding rate of ¾ and the CC-type HARQ. For example, 16QAM is used as a modulation technique for initial transmission, and QPSK is used as a modulation technique for retransmission. Specifically, this embodiment proposes a method for selecting transmission data according to the changed modulation technique during retransmission, and a method for efficiently combining the transmitted data.

Now, a description of the embodiments will be given with reference to the accompanying drawings.

First, reference will be made to an amount of data to be actually transmitted in the case where a modulation technique is changed during retransmission in the embodiments. If a modulation technique at initial transmission is defined as $M_i$, a modulation technique at retransmission as $M_r$, the number of data bits transmitted at initial transmission as $D_i$, and the number of data bits that must be transmitted during retransmission as $D_r$, the following relations are given $$\alpha = \frac{\log_2 M_r}{\log_2 M_i} \tag{1}$$

$$D_r = \alpha \times D_i \tag{2}$$

In Equations (1) and (2), a parameter $M_i$ or $M_r$ corresponding to each modulation technique is set to 64 for 64QAM, 16 for 16QAM, and 4 for QPSK. Therefore, if a modulation technique at initial transmission is 16QAM and a modulation technique at retransmission is QPSK in the embodiments, it is noted from Equation (1) that an amount of data that can be retransmitted is no more than ½ the amount of data transmitted at initial transmission. In Equation (1), α indicates a ratio of an amount of data that can be retransmitted to an amount of data transmitted at initial transmission. If the α is calculated, the amount $D_r$ of data to retransmitted is calculated by substituting the α and the $D_i$ into Equation (2).

1. First Embodiment (Coding Rate ½, PIR)

In the first embodiment, a coding rate is ½ and PIR is used as the HARQ. In addition, it is assumed that modulation techniques at initial transmission and retransmission are 16QAM and QPSK, respectively. Further, it is assumed that the number of Walsh codes used at retransmission is equal to the number of Walsh codes used at initial transmission.

In this embodiment, only three parity sub-packets will be taken into consideration, for the sake of convenience. In each table illustrated in FIGS. 7 to 11B, "O" means a sub-packet transmitted when a modulation technique at retransmission is identical to a modulation technique at retransmission, while "X" represents a sub-packet selected when a modulation technique is changed at retransmission according to an embodiment of the present invention.

FIG. 7 illustrates sub-packets that can be selected when a modulation technique is changed during retransmission in the retransmission mask section 406 of FIG. 4 or the packet selector 510 of FIG. 5.

Figure 14:
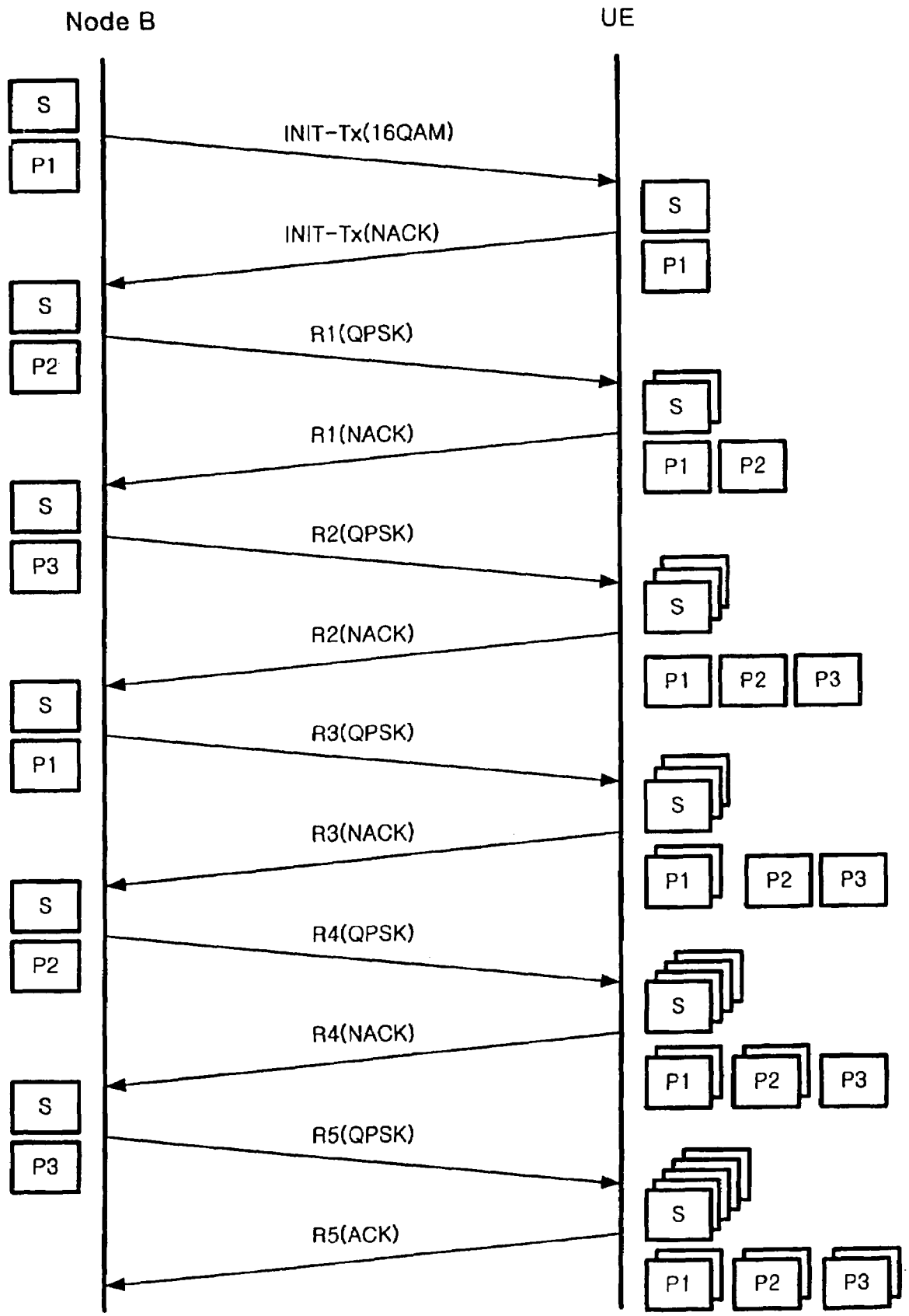
FIG. 14 illustrates a message process flow for the case where the modulation technique is not changed in a CDMA mobile communication system for high-speed data transmission.

First, a description will be made of five different cases of FIG. 7 where the same modulation technique is used at both initial transmission and retransmission. In FIG. 7, sub-packets transmitted at the initial transmission and the retransmission are represented by "O." In this case, a method of exchanging messages between a Node B and a UE is illustrated in FIG. 14.

Since the coding rate is ½ and PIR is used as the HARQ, a systematic sub-packet and a parity sub-packet transmitted at each transmission are identical to each other in size. That is, sub-packets (S,P1) are transmitted at initial transmission, and the sub-packets are transmitted in the order of (S,P2) and (S,P3) at retransmissions. Here, the P1, P2 and P3 represent redundancy parity sub-packets, and the types of possible redundancy parity sub-packets can be variously determined according to a coding rate and a puncturing pattern of a turbo encoder in use. Upon receiving the initially transmitted and retransmitted systematic sub-packets and parity sub-packets, a receiver in the UE performs combining between the same systematic sub-packets or between the same parity sub-packets. This is illustrated in FIG. 14. In addition, the receiver performs combining between the sub-packets represented by "O" or "X" in the same row of each table illustrated in FIG. 7.

Although the sub-packets to be transmitted by the transmitter can be selected in various ways according to an embodiment of the present invention, FIG. 7 shows only 5 typical examples.

Case 1 shows a method of retransmitting only systematic sub-packets for combining while ignoring redundancy parity sub-packets, even though the HARQ type is PIR. Case 1 is disadvantageous in that it cannot develop strong points of the PIR in terms of a valid coding gain, but it can remarkably increase a combining gain of the systematic sub-packets. In addition, Case 1 contributes to simplification of a hardware structure, since it operates as if the HARQ type were CC.

Case 2 shows a method of selecting a systematic sub-packet for coded bits output from a puncturer and all generated redundancy parity sub-packets during retransmission. Case 2 is advantageous in that it can obtain both a combining gain for the systematic sub-packet and a coding gain for transmission of different redundancy parity sub-packets.

Case 3 shows a method of alternately selecting a systematic sub-packet and different redundancy parity sub-packets at each retransmission, and transmitting the selected sub-packets. Case 3 can compensate a gain, as it increases a combining gain for the systematic sub-packet. Here, it should be noted in all the foregoing and following cases that a modulation technique for retransmission is QPSK. Of course, if the modulation technique at initial transmission was 64QAM, a modulation technique for retransmission will become 16QAM, a modulation technique having a one-step lower modulation order than 64QAM. Case 3 can also be realized in the similar method as the forgoing and following Cases.

Figure 15:
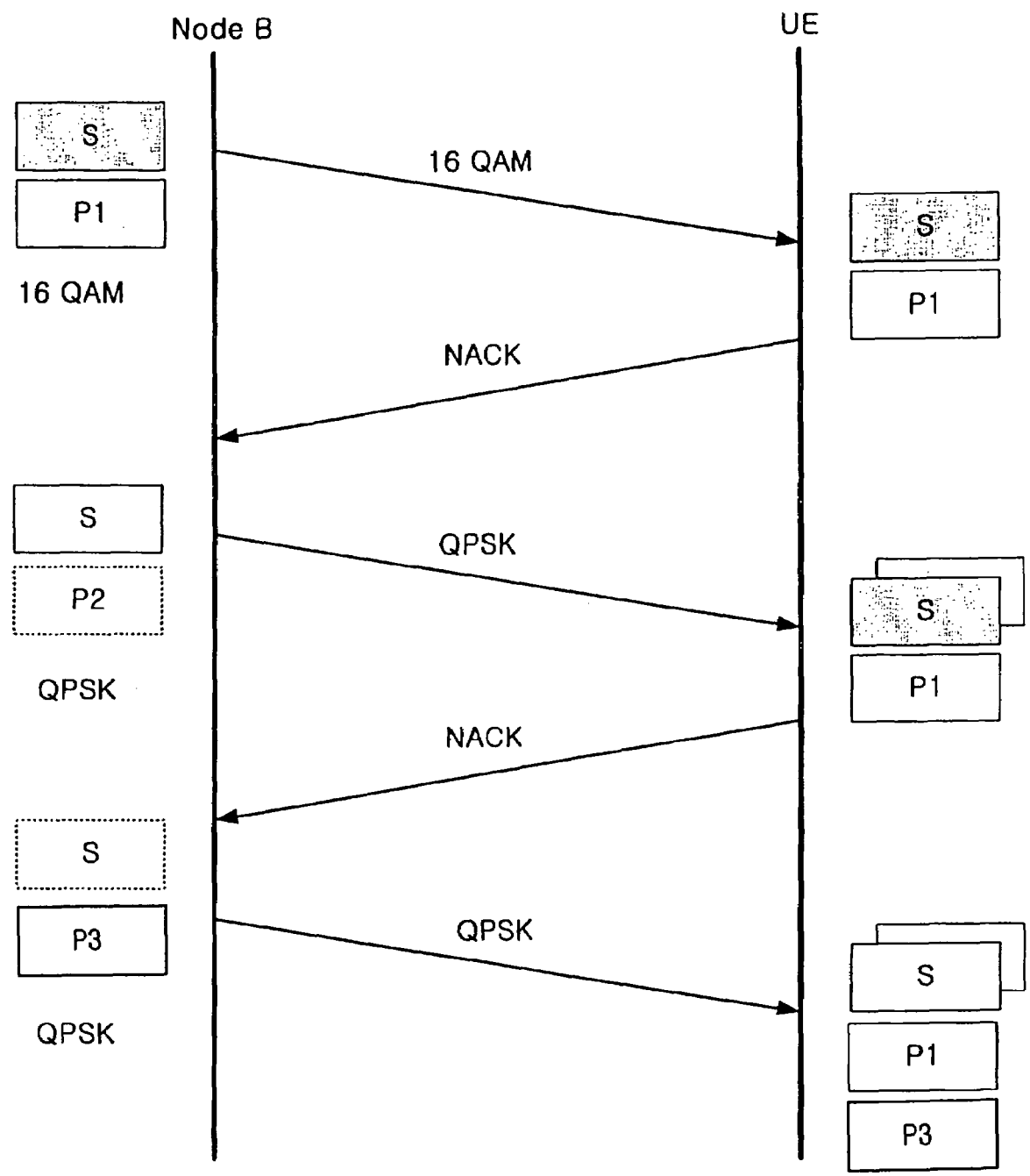
FIGS. 15 and 16 illustrate data transmission/reception processes in a mobile communication system supporting the PIR.

In Case 2 and Case 3, a process of exchanging messages between a Node B and a UE is described in FIG. 15. Referring to FIG. 15, a Node B transmits a systematic sub-packet S and a parity sub-packet P1 by 16QAM. Upon receiving NACK from a UE in response to the transmitted sub-packets, the Node B retransmits only the systematic sub-packet S by QPSK. However, upon receiving NACK again from the UE in response to the retransmitted systematic sub-packet S, the Node B retransmits a parity sub-packet P3. Thereafter, upon receiving NACK from the UE once more, the Node B retransmits the parity sub-packet P2 in Case 2, and the systematic sub-packet S in Case 3.

The three Cases stated above provide a method of selecting a sub-packet among coded bits punctured by a puncturer according to the HARQ type, so they can use both the transmitter of FIG. 4 and the transmitter of FIG. 5. In addition, the retransmission mask section 406 and the puncturer 404 of FIG. 4 can be realized combined or separate, making it possible to flexibly cope with a change in a hardware structure.

Unlike this, Case 4 and Case 5 provide a method of sequentially transmitting a systematic sub-packet and parity sub-packets regardless of the order of sub-packets to be originally transmitted in the PIR in use.

Specifically, Case 4 provides a method of starting retransmission beginning at the systematic sub-packet, and is identical to Case 2 except there is a difference in the order. Case 5 provides a method of sequentially starting retransmission beginning at the first redundancy parity sub-packet P1. Case 4 and Case 5 can increase a coding gain by taking all redundancy parity sub-packets into consideration. In addition, Case 4 and Case 5 are advantageous in that scheduling on the sub-packets to be transmitted is simplified. In the transmitter of FIG. 4, Case 4 and Case 5 can be realized by uniting the puncturer 404 and the retransmission mask section 406. Meanwhile, in the transmitter of FIG. 5, Case 4 and Case 5 can be realized by modifying a puncturing pattern.

2. Second Embodiment (Coding Rate ¾, PIR)

When a coding rate is ¾, systematic bits among the output bits of a turbo encoder are 3 times greater in number than parity bits. In order to show a unit of a transmission packet, a systematic packet is divided into same-sized sub-packets $S(1)$, $S(2)$ and $S(3)$, for the sake of convenience. Further, it is assumed in this embodiment that the number of parity sub-packets P1, P2 and P3 is 3, for the sake of convenience.

Shown in FIG. 8 are sub-packets that can be selected by the retransmission mask section 406 of FIG. 4 or the packet selector 510 of FIG. 5 when a modulation technique is changed during retransmission, and sub-packets that can be selected when the modulation technique is not changed. In each table of FIG. 8, "O" represents sub-packets transmitted when a modulation technique used at retransmission is identical to the modulation technique used at initial transmission, while "X" represents sub-packets selected when a modulation technique is changed during retransmission according to an embodiment of the present invention.

First, a description will be made of 4 cases shown in FIG. 8, where the same modulation technique is used at both initial transmission and retransmission. In FIG. 8, sub-packets transmitted at initial transmission and retransmission are represented by "O."

Since the coding rate is ¾ and PIR is used as the HARQ, a systematic sub-packet transmitted at each transmission is 3 times greater in size than a parity sub-packet. Therefore, the sub-packets are transmitted in the order of $S(1)$, $S(2)$, $S(3)$, P1 at initial transmission, and in the order of $S(1)$, $S(2)$, $S(3)$, P2 and $S(1)$, $S(2)$, $S(3)$, P3 at retransmission. Here, P1, P2, P3 represent redundancy parity sub-packets, and the types of possible redundancy parity sub-packets can be variously determined according to a coding rate and a puncturing pattern of a turbo encoder in use. Upon receiving the initially transmitted and retransmitted systematic sub-packets and parity sub-packets, a receiver in the UE performs combining between the same systematic sub-packets or between the same parity sub-packets. The receiver performs combining between the sub-packets represented by "O" or "X" in the same row of each table illustrated in FIG. 8.

Although the sub-packets to be transmitted by the transmitter can be selected in various ways in the case where a modulation technique is changed according to an embodiment of the present invention, FIG. 8 shows only 4 typical examples. In FIG. 8 also, 16QAM is used as a modulation technique for initial transmission and QPSK is used as a modulation technique for retransmission.

Case 1, being identical to Case 1 of FIG. 7, shows a method of retransmitting only systematic sub-packets for combining while ignoring redundancy parity sub-packets, even though the HARQ type is PIR. Case 1 can remarkably increase a combining gain of the systematic sub-packets. In addition, Case 1 contributes to simplification of a hardware structure. Here, since the coding rate is ¾, it is not possible to transmit the full systematic sub-packet at once. Therefore, the sub-packets are successively transmitted in the order of {S(1),S(2)}, {S(2),S(3)}, and {S(1),S(3)}.

Case 2 provides a method of selecting systematic sub-packets for coded bits output from a puncturer and all generated redundancy parity sub-packets during retransmission. Case 2 is advantageous in that it can obtain both a combining gain for the systematic sub-packet and a coding gain for transmission of different redundancy parity sub-packets. During retransmission based on Case 2, the sub-packets are successively transmitted in the order of {S(1),S(2)}, {S(3), P3}, {S(1),P1}, {S(2),P2}, and {S(1),S(3)}.

Case 3 shows a method of alternately selecting a systematic sub-packet and different redundancy parity sub-packets at each retransmission, and transmitting the selected sub-packets. Case 3 increases a combining gain of the systematic sub-packets. During retransmission based on Case 3, the sub-packets are successively transmitted in the order of {S(1),S(2)}, {S(3),P3}, {S(1),S(2)}, {S(3),P2}, and {S(1),S(2)}.

The three Cases stated above can use both the transmitter of FIG. 4 and the transmitter of FIG. 5. In addition, the retransmission mask section 406 and the puncturer 404 of FIG. 4 can be physically combined or separate, making it possible to flexibly cope with a change in a hardware structure.

Unlike Case 1 to Case 3, Case 4 provides a method of sequentially transmitting systematic sub-packets and parity sub-packets regardless of the types of sub-packets to be originally transmitted. During retransmission based on Case 4, the sub-packets are sequentially transmitted in the order of {S(1), S(2)}, {S(3),P1}, {S(1),P2}, {S(2),P3}, {S(3),S(1)}. Case 4 can increase a coding gain by taking all redundancy parity sub-packets into consideration. In addition, Case 4 is advantageous in that scheduling on the sub-packets to be transmitted is simplified. Case 4 can be realized by uniting the puncturer 404 and the retransmission mask section 406 of FIG. 4.

3. Third Embodiment (Coding Rate ½, FIR)

In this embodiment, consideration will be taken into only 5 parity sub-packets for the sake of convenience. Shown in FIG. 9 are sub-packets that can be selected by the retransmission mask section 406 of FIG. 4 or the packet selector 510 of FIG. 5 when a modulation technique is changed during retransmission according to the third embodiment. In each table of FIGS. 9A and 9B, "O" represents sub-packets transmitted when a modulation technique used at retransmission is identical to the modulation technique used at initial transmission, while "X" represents sub-packets selected when a modulation technique is changed during retransmission according to an embodiment of the present invention. Unlike the PIR, the FIR can transmit, during retransmission, a systematic sub-packet after transmitting all redundancy parity sub-packets.

First, a description will be made of 6 cases shown in FIG. 9, where the same modulation technique is used at both initial transmission and retransmission. In FIG. 9, sub-packets transmitted at initial transmission and retransmission are represented by "O."

Since the coding rate is ½ and FIR is used as the HARQ, only the parity sub-packets are transmitted during retransmission. That is, at initial transmission, the sub-packets (S,P1) are transmitted. At retransmission, the sub-packets are sequentially transmitted in the order of (P2,P3) and (P4,P5), and thereafter, the sub-packets are transmitted again beginning at (S,P1). Therefore, a method of selecting the sub-packets during retransmission is somewhat different. Although there are many types of the parity sub-packets, consideration will be taken into only 5 parity sub-packets for the sake of convenience. In FIG. 9, P1, P2, P3, P4 and P5 represent redundancy parity sub-packets, and the types of possible redundancy parity sub-packets can be variously determined according to a coding rate and a puncturing pattern of a turbo encoder in use. Although there are many methods of generating redundancy parity sub-packets, the present invention proposes a method of defining outputs of two convolutional encoders in a turbo encoder as a transmission pair. That is, in the retransmission packets (P2,P3) and (P4,P5), P2 and P4 are comprised of parity bits (Y1 and Y2 of FIG. 2) output from a first encoder in the turbo encoder, while P3 and P5 are comprised of parity bits (Z1 and Z2 of FIG. 2) output from a second encoder in the turbo encoder. Here, P2 and P4 output from the same encoder are different redundancies, and P3 and P5 are also different redundancies. In this manner, the selected retransmission redundancy parity sub-packets can serve as typical parity sub-packets for all systematic bits. Upon receiving the initially transmitted and retransmitted systematic sub-packets and parity sub-packets, a receiver in the UE performs combining between the same systematic sub-packets or between the same parity sub-packets. However, as the FIR can transmit, during retransmission, the systematic sub-packet after transmitting all redundancy parity sub-packets, the combining is performed after the redundancy parity sub-packets are all transmitted. In addition, the receiver performs combining between the sub-packets represented by "O" or "X" in the same row of each table illustrated in FIG. 9.

Although the sub-packets to be transmitted by the transmitter can be selected in various ways, FIG. 9 show only 6 typical examples. In FIG. 9 also, 16QAM is used as a modulation technique for initial transmission and QPSK is used as a modulation technique for retransmission.

Case 1 provides a method of alternately selecting all redundancy parity sub-packets during retransmission, and can fully utilize an original coding gain of the FIR. Of course, as QPSK is used during retransmission, an amount of data that can be retransmitted is no more than ½ the amount of data transmitted at initial transmission. Therefore, the transmission time should be doubled in order to transmit all redundancy parity sub-packets. However, since the redundancy parity sub-packets transmitted at each retransmission have much greater reliability, it is possible to sufficiently compensate for a decrease in the coding gain. That is, a transmission method based on Case 1 sacrifices one half of the coding gain of the FIR, but it is possible to obtain an improved gain by changing a modulation technique. In Case 1, the sub-packets (S,P1) are transmitted at initial transmission, and the sub-packets P2, P4, S, P3 and P5 are sequentially transmitted at retransmission.

Case 2 is similar to Case 1. In Case 1, sub-packets P2 and P4 are first transmitted and sub-packets P3 and P5 are transmitted later. However, in Case 2, the sub-packets are transmitted in the order of P2, P5, P3 and P4. The reason is because as the sub-packets P2 and P4 are outputs of the first convolutional encoder in the turbo encoder and the sub-packets P3 and P5 are outputs of the second convolutional encoder, it is necessary to alternately transmit the sub-packets in order to fully utilize the characteristics of the turbo encoder. In Case 2, the sub-packets (S,P1) are transmitted at initial transmission, and the sub-packets are transmitted in the order of P2, P5, S, P3 and P4 during retransmission.

Unlike Case 1, Case 3 provides a method of continuously retransmitting only a part of the redundancy parity sub-packets, and can obtain a gain by allowing combining between transmitted parity sub-packets, though it does not retransmit all redundancy parity sub-packets. In addition, Case 3 contributes to simplification of realization. In Case 3, the sub-packets (S,P1) are initially transmitted, and the sub-packets are sequentially transmitted in the order of P2, P4, S, P2 and P4 during retransmission.

Like Case 2, Case 4 limits the transmission parity sub-packets in Case 2 to P2 and P5 in order to utilize the characteristics of the turbo encoder. In Case (4), the sub-packets (S,P1) are initially transmitted, and the sub-packets are sequentially transmitted in the order of P2, P5, S, P2 and P5 during retransmission.

Case 1 to Case 4 can use both the transmitter of FIG. 4 and the transmitter of FIG. 5. In addition, the retransmission mask section 406 and the puncturer 404 of FIG. 4 can be physically combined or separate, making it possible to flexibly cope with a change in a hardware structure.

Case 5 and Case 6 provide a method of sequentially transmitting all redundancy parity sub-packets in order to obtain a coding gain of the FIR. Case 5 provides a method of starting retransmission beginning at a systematic sub-packet, and Case 6 provides a method of starting retransmission beginning at a parity sub-packet. Case 5 and Case 6 are advantageous in that they can be simply realized. However, in Case 5 and Case 6, a puncturing pattern different from the original puncturing pattern for the FIR must be used. Therefore, scheduling on sub-packet selection is performed by firmly uniting the puncturer 404 and the retransmission mask section 406 in the transmitter of FIG. 4, and when the transmitter of FIG. 5 is used, Case 5 and Case 6 can be realized by changing the puncturing pattern of the puncturer 504.

4. Fourth Embodiment (Coding Rate ¾, FIR)

When a coding rate is ¾, systematic bits among the output bits of a turbo encoder are 3 times larger in number than parity bits. In order to show a unit of a transmission packet, a systematic packet is divided into same-sized sub-packets S(1), S(2) and S(3), for the sake of convenience. Therefore, the sub-packets are transmitted in the order of S(1), S(2), S(3), P1 at initial transmission, and in the order of (P2,P3) and (P4,P5) at retransmission. Here, the sub-packet P1 is equal in size to the sub-packets S(1), S(2) and S(3), and the sub-packets P2, P3, P4 and P5 are two times larger in size than the sub-packet P1. Also, 16QAM is used as a modulation technique for initial transmission and QPSK is used as a modulation technique for retransmission. FIG. 10 show methods of selecting transmission sub-packets when a modulation technique is changed during retransmission.

Case 1 provides a method of alternately selecting all redundancy parity sub-packets during retransmission. That is, Case 1 selects the sub-packets in the order of P2, P4, P3 and P5 during retransmission. Case 1 can fully utilize an original coding gain of the FIR. Of course, as QPSK is used during retransmission, an amount of data that can be retransmitted is no more than ½ the amount of data transmitted at initial transmission. Therefore, the transmission time should be doubled in order to transmit all redundancy parity sub-packets. However, since the redundancy parity sub-packets transmitted at each retransmission have much greater reliability, it is possible to sufficiently compensate for a decrease in the coding gain. Further, it is possible to obtain an improved gain by changing a modulation technique.

Case 2, though similar to Case 1, transmits the sub-packets in the order of P2, P5, P3 and P4, while Case 1 first transmits the sub-packets P2 and P4, and next transmits the sub-packets P3 and P5. The reason for transmitting the sub-packets in the manner of Case 2 is as follows. As stated above, since the sub-packets P2 and P4 are outputs of the first convolutional encoder of the turbo encoder and the sub-packets P3 and P5 are outputs of the second convolutional encoder, it is preferable to alternately transmit the sub-packets in order to fully utilize the characteristics of the turbo encoder.

Unlike Case 1, Case 3 provides a method of retransmitting only a part of the redundancy parity sub-packets. That is, Case 3 repeatedly transmits the sub-packets P2 and P4. Therefore, although Case 3 does not retransmit all redundancy parity sub-packets, it enables combining on the transmitted sub-packets, thereby obtaining a combining gain. In addition, Case 3 is advantageous in that it can be simply realized.

Like Case 2, Case 4 restricts the transmission parity sub-packets to P2 and P5 in order to utilize the characteristics of the turbo encoder. That is, Case 4 repeatedly transmits the sub-packets P2 and P5.

Case 1 to Case 4 can use both the transmitter of FIG. 4 and the transmitter of FIG. 5. In addition, the retransmission mask section 406 and the puncturer 404 of FIG. 4 can be physically combined or separate, making it possible to flexibly cope with a change in a hardware structure.

Case 5 and Case 6 provide a method of sequentially transmitting all redundancy parity sub-packets in order to obtain a coding gain of the FIR. Case 5 starts retransmission from the systematic sub-packets, and Case 6 starts retransmission from the parity sub-packets. Case 5 and Case 6 are advantageous in that they can be simply realized. However, an independent puncturing pattern different from the original puncturing pattern for the FIR must be used. Therefore, scheduling on sub-packet selection is performed by firmly uniting the puncturer 404 and the retransmission mask section 406 in the transmitter of FIG. 4, and when the transmitter of FIG. 5 is used, Case 5 and Case 6 can be realized by changing the puncturing pattern.

5. Fifth Embodiment (Coding Rate ½, CC)

FIG. 11A illustrates a method of selecting sub-packets when CC is used as the HARQ. When a coding rate is ½, systematic sub-packets and parity sub-packets are transmitted in the same ratio, and the same sub-packets as those transmitted at initial transmission are transmitted even at each retransmission, contributing to simplified realization.

Case 1 provides a method of alternatively selecting systematic sub-packets and parity sub-packets during retransmission, so that the systematic sub-packets and the parity sub-packets are all combined, thereby increasing its performance gain.

Unlike Case 1, Case 2 provides a method of retransmitting only the systematic sub-packet. Case 2 is advantageous in that it can be simply realized.

6. Sixth Embodiment (Coding Rate ¾, CC)

FIG. 11B illustrates another method of selecting sub-packets when CC is used as the HARQ. When a coding rate is ¾, 3 systematic sub-packets S1, S2, S3 and one parity sub-packet P are generated, and the same sub-packets as those transmitted at initial transmission are transmitted even at each retransmission, contributing to simplified realization.

Case 1 provides a method of alternatively selecting the 4 sub-packets S(1), S(2), S(3), and P during retransmission, so that the systematic sub-packet and the parity sub-packets are all combined sequentially, thereby increasing its performance gain.

Unlike Case 1, Case 2 provides a method of retransmitting only the systematic sub-packet. Case 2 is simpler than Case 1 in its realization, but lower than Case 1 in performance.

Figure 16:
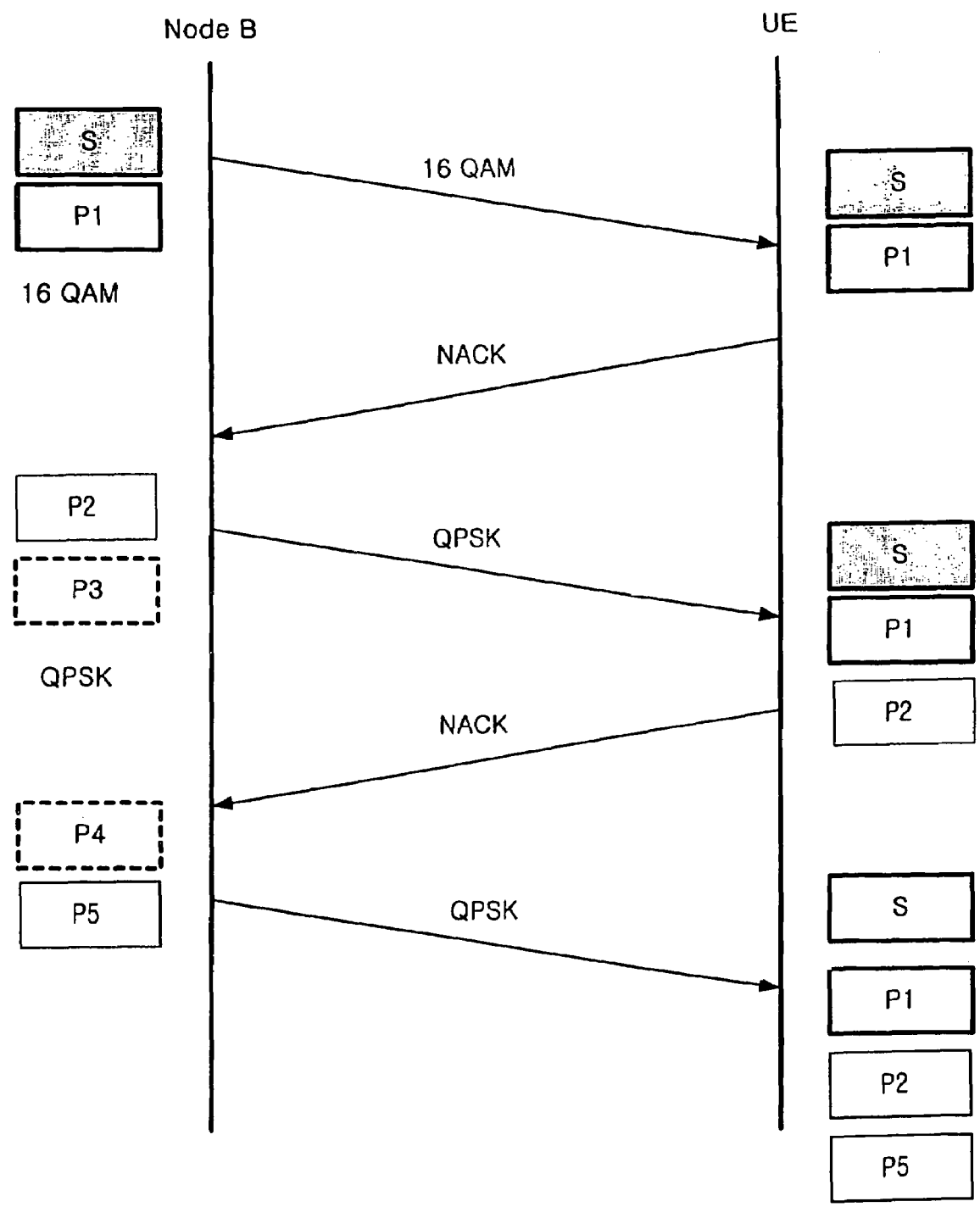

FIGS. 15 and 16 illustrate processes of exchanging messages between a Node B and a UE in a mobile communication system supporting the IR-type HARQ. Specifically, FIG. 15 illustrates the process in a mobile communication system supporting the PIR, and FIG. 16 illustrates the process in a mobile communication system supporting the FIR. In either case, a coding rate of ½ is used. In FIGS. 15 and 16, the systematic sub-packet S is identical in size to the parity sub-packets P1, P2 and P3. For reference, shaded blocks and blocks drawn by a solid line represent sub-packets that can be transmitted, while blocks drawn by a dotted line represent sub-packets that cannot be transmitted when a changed modulation technique is used.

First, FIG. 15 illustrates the processes for Case 2 and Case 3 of FIG. 7. In brief, at initial transmission, a Node B transmits all data packets (S,P1) by 16QAM. Upon receiving a retransmission request NACK from a UE, the Node B selects only a systematic sub-packet S among the sub-packets (S,P2) and retransmits the selected systematic sub-packet S by QPSK. At this point, the UE combines the systematic sub-packet previously transmitted by the 16QAM with the systematic sub-packet retransmitted by the QPSK, increasing decoding efficiency. However, if a CRC error occurs, the UE again transmits a retransmission request NACK to the Node B. The Node B then selects a parity sub-packet P3 instead of the systematic sub-packet S among the sub-packets (S,P3) that can be transmitted, and transmits the selected parity sub-packet P3 by QPSK. Therefore, the UE performs decoding on the combined systematic sub-packet and two parity sub-packets P1 and P3, increasing decoding performance.

Next, FIG. 16 illustrates the process for Case 2 shown for FIG. 9. In brief, at initial transmission, a Node B transmits all data packets (S,P1) by 16QAM. Upon receiving a retransmission request NACK from a UE, the Node B selects only a parity sub-packet P2 among the sub-packets (P2,P3) and retransmits the selected parity sub-packet P2 by QPSK. At this point, the UE combines the sub-packets (S,P1) previously transmitted by the 16QAM with the parity sub-packet P2 retransmitted by the QPSK, increasing decoding efficiency. However, if a CRC error occurs, the UE again transmits a retransmission request NACK to the Node B. The Node B then selects a parity sub-packet P5 among the sub-packets (P4,P5) that can be transmitted, and transmits the selected parity sub-packet P5 by QPSK. Therefore, the UE performs decoding on the systematic sub-packet S and three parity sub-packets P1, P2 and P5, increasing decoding performance.

Figure 17:
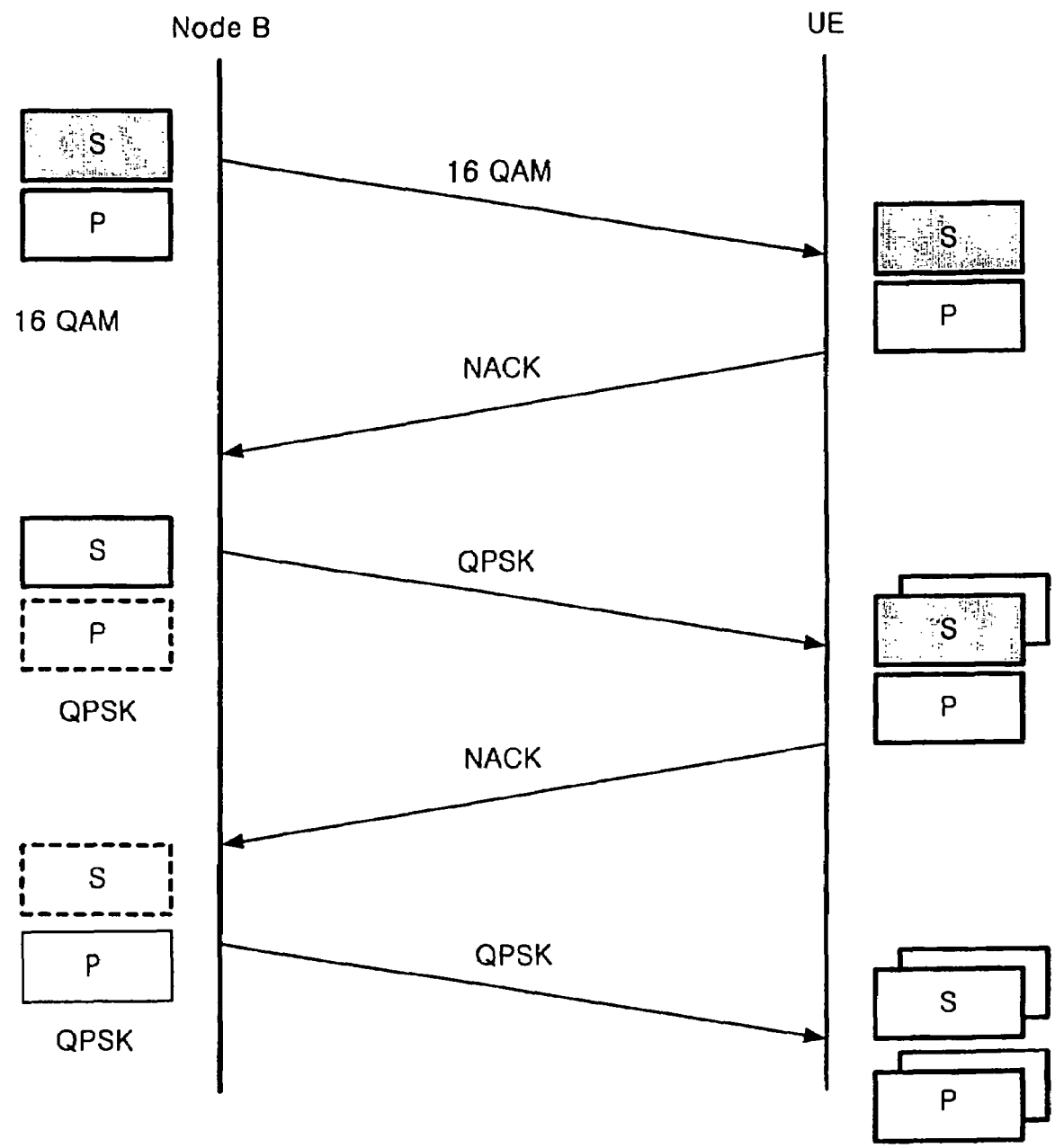
FIGS. 17 and 18 illustrate data transmission/reception processes in a mobile communication system supporting the CC.
Figure 18:
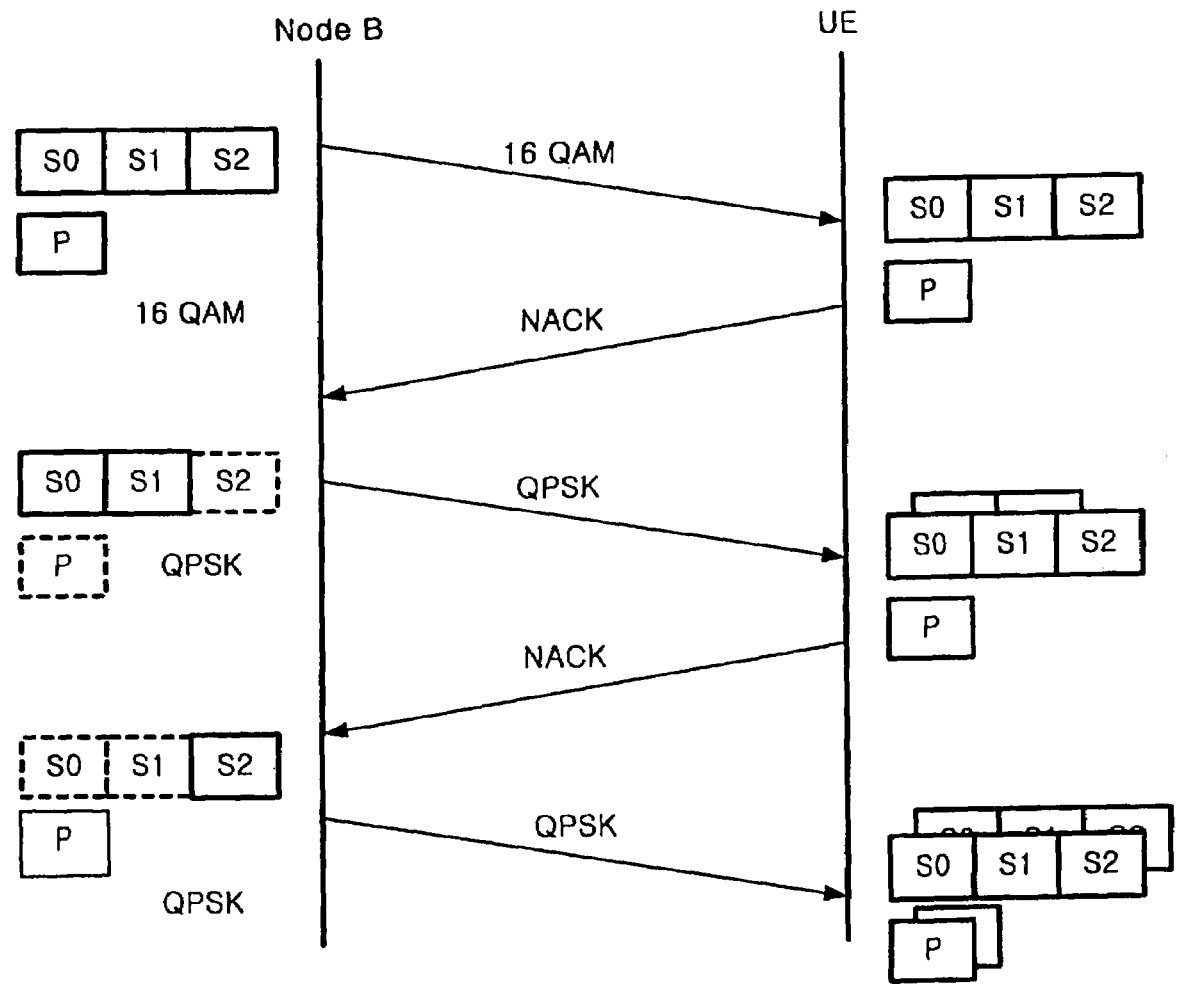

FIGS. 17 and 18 illustrate processes of exchanging messages between a Node B and a UE in a mobile communication system supporting the CC-type HARQ. Specifically, FIG. 17 illustrates the process in a mobile communication system supporting a coding rate of ½, and FIG. 18 illustrates the process in a mobile communication system supporting a coding rate of ¾. In the CC, the same packets are transmitted at both initial transmission and retransmission. Therefore, a process of properly selecting a sub-packet according to a low-order modulation technique during retransmission has a structure much simpler than the process in the mobile communication system supporting the IR.

First, FIG. 17 illustrates the process for Case 1 of FIG. 11A. In brief, at initial transmission, a Node B transmits data packets (S,P) by 16QAM, and a UE checks CRC of the transmitted data packets using a turbo encoder. If a CRC error occurs, the UE transmits a retransmission request NACK to the Node B. Upon receiving the retransmission request NACK, the Node B transmits a systematic sub-packet S among the data packets (S,P) by QPSK, a modulation technique having a lower modulation order than the 16QAM used at the initial transmission. At this point, the UE combines the initially transmitted systematic sub-packet with the retransmitted systematic sub-packet. Here, since the retransmitted systematic sub-packet was transmitted by QPSK, the combining effect is improved. If NACK is received again from the UE, the Node B transmits the parity sub-packet P among the data packets (S,P) by QPSK, so the combining effect on the data packets (S,P) at the UE is maximized.

Next, FIG. 18 illustrates the process for Case 1 of FIG. 11B. The process is equal to the process of FIG. 17 except the size of the sub-packets S and P because of the coding rate of ¾, so a detailed description will not be provided.

As described above, the present invention provides a method for changing a modulation technique to a low-order modulation technique during retransmission regardless of a selected modulation technique in a high-speed radio packet data communication system supporting AMCS and HARQ. Further, the present invention provides a system for remarkably increasing reliability for LLR values of input bits applied to a turbo decoder by selectively transmitting sub-packets with higher priority when retransmitting only a part of an initially transmitted packet by the changed modulation technique. Therefore, the novel system has a low frame error rate compared to the existing system, increasing transmission efficiency. The invention can be applied to all kinds of transceivers in a wire/wireless communication system. In addition, the present invention, if applied to the HSDPA and 1xEV-DV proposed by 3GPP and 3GPP2, can improve the entire system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for retransmitting coded bits by a transmitter in response to a retransmission request from a receiver in a mobile communication system which selects coded bits to be transmitted by puncturing coded bits output from an encoder at a given mother coding rate according to a predetermined puncturing pattern, and transmits from the transmitter to the receiver a stream of symbols obtained by symbol-mapping the selected coded bits by a given modulation technique, the method comprising the steps of:

selecting a modulation technique to be used at retransmission as a modulation technique having a lower modulation order than a modulation technique used at initial transmission;

distributing the transmission coded bits punctured by a puncturing pattern, said puncturing pattern selected to correspond to an HARQ type utilized by the transmitter, into a plurality of streams of sub-packets having a given size, verifying if a packet is a retransmission packet, and if the packet is a retransmission packet, setting an amount of data to be retransmitted to be less than the amount of data transmitted in an initial transmission;

selecting as many sub-packets as the number of coded bits that are to be symbol-mapped by the selected modulation technique among the streams of sub-packets; and symbol-mapping coded bits constituting the selected sub-packets by the selected modulation technique and transmitting the symbol-mapped coded bits to the receiver, wherein the coding rate at initial transmission is equal to the coding rate at retransmission.

2. The method of claim 1, wherein the streams of sub-packets undergo interleaving.

3. The method of claim 1, wherein the streams of sub-packets include a stream of systematic sub-packets each comprised of coded bits with higher priority and a stream of parity sub-packets each comprised of coded bits with lower priority among the coded bits.

4. The method of claim 3, wherein the stream of sub-packets is selected in such a manner that the systematic sub-packets are selected first.

5. The method of claim 3, wherein the stream of sub-packets is selected in such a manner that the systematic sub-packets and the parity sub-packets are alternately selected as many times as the number of retransmissions.

6. The method of claim 1, wherein the stream of sub-packets is selected in such a manner that previously non-transmitted sub-packets are first selected among the sub-packets.

7. An apparatus for retransmitting coded bits by a transmitter in response to a retransmission request from a receiver in a mobile communication system which selects coded bits to be transmitted by puncturing coded bits output from an encoder at a given mother coding rate according to a predetermined puncturing pattern, and transmits from the transmitter to the receiver a stream of symbols obtained by symbol-mapping the selected coded bits by a given modulation technique, the apparatus comprises:

a controller for selecting an HARO (Hybrid Automatic Repeat Request) type to be used at retransmission, and selecting a modulation technique to be used at the retransmission as a modulation technique having a lower modulation order than a modulation technique used at initial transmission, and verifying if a packet is a retransmission packet, if the packet is a retransmission packet, setting an amount of data to be retransmitted to be less than the amount of data transmitted in an initial transmission;

a packet distributor for distributing transmission coded bits punctured by a puncturing pattern, said puncturing pattern selected to correspond to an HARO type utilized by the transmitter, into a plurality of streams of sub-packets having a given size;

a packet selector for selecting as many sub-packets as the number of coded bits that are to be symbol-mapped by the selected modulation technique among the streams of sub-packets; and a modulator for symbol-mapping coded bits constituting the selected sub-packets by the selected modulation technique and transmitting the symbol-mapped coded bits to the receiver, wherein the coding rate at initial transmission is equal to the coding rate at retransmission.

8. The apparatus of claim 7, wherein the streams of sub-packets undergo interleaving.

9. The apparatus of claim 7, wherein the streams of sub-packets include a stream of systematic sub-packets each comprised of coded bits with higher priority and a stream of parity sub-packets each comprised of coded bits with lower priority among the coded bits.

10. The apparatus of claim 9, wherein the packet selector first selects the systematic sub-packets.

11. The apparatus of claim 9, wherein the packet selector alternately selects the systematic sub-packets and the parity sub-packets as many times as the number of retransmissions.

12. The apparatus of claim 7, wherein the packet selector first selects previously non-transmitted sub-packets among the sub-packets.

\* \* \* \* \*